United States Patent
Cui et al.

(10) Patent No.: US 12,135,715 B1
(45) Date of Patent: Nov. 5, 2024

(54) MULTI-PHASE QUERY PLAN CACHING

(71) Applicant: Snowflake Inc., Bozeman, MT (US)

(72) Inventors: Xuelai Cui, Seattle, WA (US); Prashant Gaharwar, Fremont, CA (US); Vineet Garg, San Jose, CA (US); Boyung Lee, Kirkland, WA (US); Kevin Ye Jie Li, Burnaby (CA); Nicola Dan Onose, San Jose, CA (US); Andrew Xue, San Mateo, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/309,490

(22) Filed: Apr. 28, 2023

(51) Int. Cl.
*G06F 16/30* (2019.01)
*G06F 11/34* (2006.01)
*G06F 16/2452* (2019.01)
*G06F 16/2453* (2019.01)

(52) U.S. Cl.
CPC .... *G06F 16/24542* (2019.01); *G06F 11/3409* (2013.01); *G06F 16/24528* (2019.01); *G06F 16/24539* (2019.01)

(58) Field of Classification Search
CPC ......... G06F 16/24542; G06F 16/24539; G06F 16/24528
See application file for complete search history.

(56) References Cited

U.S. PATENT DOCUMENTS

| | | | |
|---|---|---|---|
| 6,356,887 B1 * | 3/2002 | Berenson | G06F 16/24524 |
| 11,461,327 B1 * | 10/2022 | Cruanes | G06F 16/24539 |
| 2017/0228391 A1 * | 8/2017 | Savla | G06F 12/0871 |
| 2018/0285416 A1 * | 10/2018 | Bestfleisch | G06F 16/24542 |
| 2020/0210429 A1 * | 7/2020 | Sinclair | G06F 16/24542 |
| 2023/0024210 A1 * | 1/2023 | Won | G06F 16/217 |
| 2023/0385276 A1 * | 11/2023 | Bok | G06F 16/24542 |
| 2024/0012814 A1 * | 1/2024 | Chong | G06F 16/24573 |

OTHER PUBLICATIONS

"International Application Serial No. PCT/US2024/026563, International Search Report mailed May 29, 2024", 2 pgs.
"International Application Serial No. PCT/US2024/026563, Written Opinion mailed May 29, 2024", 3 pgs.

\* cited by examiner

*Primary Examiner* — Khanh B Pham
(74) *Attorney, Agent, or Firm* — Schwegman Lundberg & Woessner, P.A.

(57) ABSTRACT

The subject technology receives a query, the query including a statement for performing the query. The subject technology performs a first lookup operation on a multi-phase cache based on the query. The subject technology performs, in response to a first cache miss of the multi-phase cache, parsing of the statement from the query. The subject technology performs, based on the parsing, a compilation process on the query to generate a compiled query plan, the compilation process determining an optimization and a generalization for the query. The subject technology determines that the compiled query plan is cacheable. The subject technology registers, in response to the compiled query plan being cacheable, a dummy entry in the multi-phase cache.

28 Claims, 20 Drawing Sheets

MULTI-PHASE QUERY PLAN CACHING

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
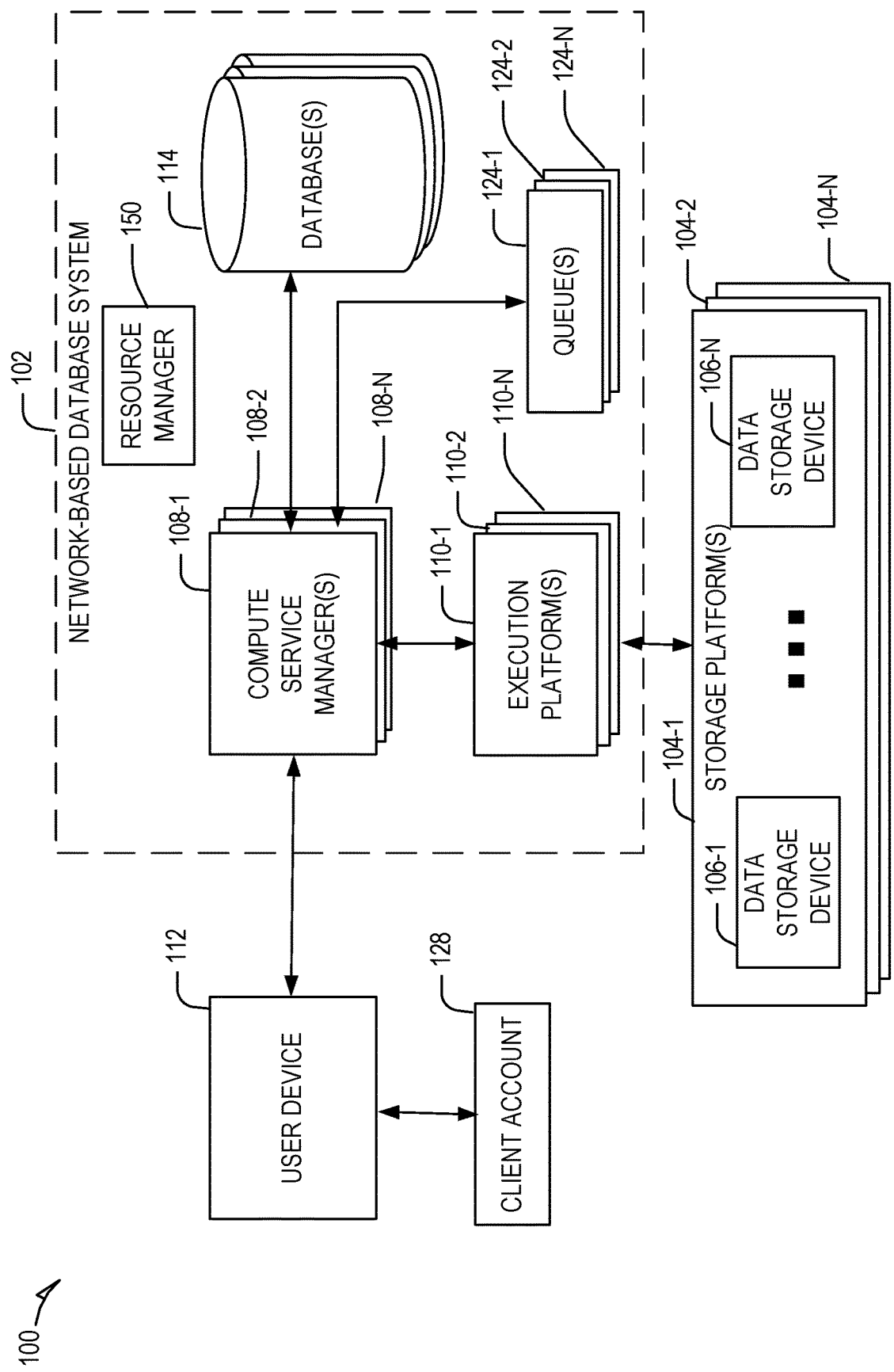
FIG. 1 illustrates an example computing environment that includes a network-based database system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

FIG. 1 illustrates an example computing environment 100 that includes a network-based database system 102 in communication with a storage platform 104-1, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

In some embodiments, the network-based database system 102 includes compute service manager 108-1 to compute service manager 108-N, each of which can be in communication with one or more of queue 124-1 to queue 124-N, a client account 128, database(s) 114, and execution platform 110-1 to execution platform 110-N. In embodiments, each execution platform can correspond to a given (or different) cloud service provider (e.g., AWSR, Google Cloud Platform®, Microsoft Azure®, and the like).

In an embodiment, a compute service manager (e.g., any of the compute service managers shown in FIG. 1) does not receive any direct communications from a client account 128 and only receives communications concerning jobs from the queue. In particular implementations, a compute service manager can support any number of client accounts 128 such as end users corresponding to respective one or more of user device 112 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108-1 to compute service manager 108-N can correspond to a particular cluster (or clusters) of computing resources as described further herein.

Thus it is appreciated that embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 includes one or more compute service managers, execution platforms, and databases. The network-based database system 102 hosts and provides database services to multiple client accounts. Administrative users can create and manage identities (e.g., users, roles, and groups) and use permissions to allow or deny access to the identities to resources and services.

Each compute service manager (e.g., any of the compute service managers shown in FIG. 1) coordinates and manages operations of the network-based database system 102. The compute service manager also performs query optimization and compilation as well as managing clusters of computing services that provide compute resources (also referred to as "virtual warehouses"). The compute service manager can support any number of client accounts such as end users providing data storage and retrieval requests, system administrators managing the systems and methods described herein, and other components/devices that interact with compute service manager 108-1.

The compute service manager (e.g., any of the compute service managers shown in FIG. 1) is also in communication with a user device 112. The user device 112 corresponds to a user of one of the multiple client accounts supported by the network-based database system 102. As shown, the user is associated with a client account 128. In some embodiments, the compute service manager 108-1 does not receive any direct communications from the user device 112 and only receives communications concerning jobs from a queue 124-1 within the network-based database system 102.

The compute service manager is also coupled to one or more database 114, which is associated with the data stored in the computing environment 100. The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In embodiments, the compute service manager is also coupled to one or more metadata databases that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions.

This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager scans the table to find the information requested by the query. The table may include millions and millions of rows, and it would be very time consuming and it would require significant computing resources for the compute service manager to scan the entire table. The micro-partition organization along with the systems, methods, and devices for database metadata storage of the subject technology provide significant benefits by at least shortening the query response time and reducing the amount of computing resources that are required for responding to the query.

The compute service manager may find the cells of database data by scanning database metadata. The multiple level database metadata of the subject technology enables the compute service manager to quickly and efficiently find the correct data to respond to the query. The compute service manager may find the correct table by scanning table metadata across all the multiple tables in a given database. The compute service manager may find a correct grouping of micro-partitions by scanning multiple grouping expression properties across the identified table. Such grouping expression properties include information about database data stored in each of the micro-partitions within the grouping.

The compute service manager may find a correct micro-partition by scanning multiple micro-partition expression properties within the identified grouping of micro-partitions. The compute service manager may find a correct column by scanning one or more column expression properties within the identified micro-partition. The compute service manager may find the correct row(s) by scanning the identified column within the identified micro-partition. The compute service manager may scan the grouping expression properties to find groupings that have data based on the query. The compute service manager reads the micro-partition expression properties for that grouping to find one or more individual micro-partitions based on the query. The compute service manager reads column expression properties within each of the identified individual micro-partitions. The compute service manager scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

In some embodiments, the compute service manager may determine that a job should be performed based on data from the database 114. In such embodiments, the compute service manager may scan the data and determine that a job should be performed to improve data organization or database performance. For example, the compute service manager may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager may determine that a job should be performed. In some embodiments, the compute service manager determines that a job should be performed based on a trigger event and stores the job in a queue until the compute service manager is ready to schedule and manage the execution of the job. In an embodiment of the disclosure, the compute service manager determines whether a table or pruning index needs to be reclustered based on one or more DML commands being performed, wherein one or more of DML commands constitute the trigger event.

The compute service manager may receive rules or parameters from the client account 128 and such rules or parameters may guide the compute service manager in scheduling and managing internal jobs. The client account 128 may indicate that internal jobs should only be executed at certain times or should only utilize a set maximum amount of processing resources. The client account 128 may further indicate one or more trigger events that should prompt the compute service manager to determine that a job should be performed. The client account 128 may provide parameters concerning how many times a task may be re-executed and/or when the task should be re-executed.

The compute service manager is in communication with one or more queue 124-1. In an embodiment, the compute service manager does not receive any direct communications from a client account 128 and only receives communications concerning jobs from the queue 124-1. In particular implementations, the compute service manager can support any number of client accounts 128 such as end users providing data storage and retrieval requests, system administrators managing the systems and methods described herein, and other components/devices that interact with compute service manager.

The queue 124-1 may provide a job to the compute service manager. One or more jobs may be stored in the queue 124-1 in an order of receipt and/or an order of priority, and each of those one or more jobs may be communicated to the compute service manager to be scheduled and executed.

In an implementation, the queue 124-1 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124-1 may determine internal jobs that should be performed to improve the performance of the database and/or to improve the organization of database data. In an embodiment, the queue 124-1 does not store queries to be executed for a client account but instead only stores database jobs that improve database performance.

A compute service manager is further coupled to an execution platform (e.g., one of execution platform 110-1, execution platform 110-2, execution platform 110-N), which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 106-1 to 106-N, and each other storage platform can also include multiple data storage devices. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, AMAZON S3 storage systems or any other data storage technology. Additionally, the storage platform 104 may include distributed file systems (such as Hadoop Distributed File Systems (HDFS)), object storage systems, and the like. Similarly, any of the data storage devices in other storage platforms can also have similar characteristics described above in connection with storage platform 104-1.

The execution platform (e.g., any of the execution platforms shown in FIG. 1) comprises a plurality of compute nodes. A set of processes on a compute node executes a query plan compiled by the compute service manager. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108-1; a fourth process to establish communication with the compute service manager 108-1 after a system boot; and a fifth process to handle all communication with a compute cluster for a given job provided by the compute service manager 108-1 and to communicate information back to the compute service manager 108-1 and other compute nodes of the execution platform.

A relational join is a data processing operation in a relational data management system. For example, a join is a binary operator, taking two relations R and S, and a binary predicate θ as inputs, and producing a single relation which contains the set of all combinations of tuples in R and S which satisfy the predicate θ.

In an example, a single query can performs multiple join operations (among other types of operations), and a tree-shaped (or tree structure) execution plan (e.g., a query plan) can be generated to represent the query where such a query plan includes a set of nodes corresponding to various operations that are performed during query execution. For illustration, join operations can form intermediate nodes and group nodes of the tree structure representing the query plan, while base relations form analogous leaves of that tree structure of the query plan. Data flows from the leaves of the tree structure towards the root, where the final query result is produced.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110-1. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Each of compute service manager, database, execution platform, and storage platform shown in FIG. 1 may be implemented as a distributed system (e.g., distributed across multiple systems/platforms at multiple geographic locations). Additionally, each of the compute service manager, database, execution platform, and storage platform can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by a compute service manager. These jobs are scheduled and managed by the compute service manager to determine when and how to execute the job. For example, the compute service manager may divide the job into multiple discrete tasks and may determine what data is needed to execute each of the multiple discrete tasks. The compute service manager may assign each of the multiple discrete tasks to one or more nodes of an execution platform to process the task. The compute service manager 108-1 may determine what data is needed to process a task and further determine which nodes within the execution platform 110-1 are best suited to process the task. Some nodes may have already cached the data needed to process the task and, therefore, be a good candidate for processing the task. Metadata stored in the database 114 assists the compute service manager in determining which nodes in the execution platform have already cached at least a portion of the data needed to process the task. One or more nodes in the execution platform process the task using data cached by the nodes and, if necessary, data retrieved from the storage platform. It is desirable to retrieve as much data as possible from caches within the execution platform because the retrieval speed is typically much faster than retrieving data from the storage platform.

As shown in FIG. 1, the computing environment 100 separates the execution platforms from the storage platforms. In this arrangement, the processing resources and cache resources in the execution platforms operate independently of the data storage devices in the storage platforms. Thus, the computing resources and cache resources are not restricted to specific data storage devices. Instead, all computing resources and all cache resources may retrieve data from, and store data to, any of the data storage resources in the storage platform.

As described further herein, a resource manager 150 can perform load balancing operation in connection with availability zones ("AZ" as mentioned further herein) including different clusters of instances of compute service managers with varying computing resources (e.g., different virtual warehouses, and the like).

Figure 2:
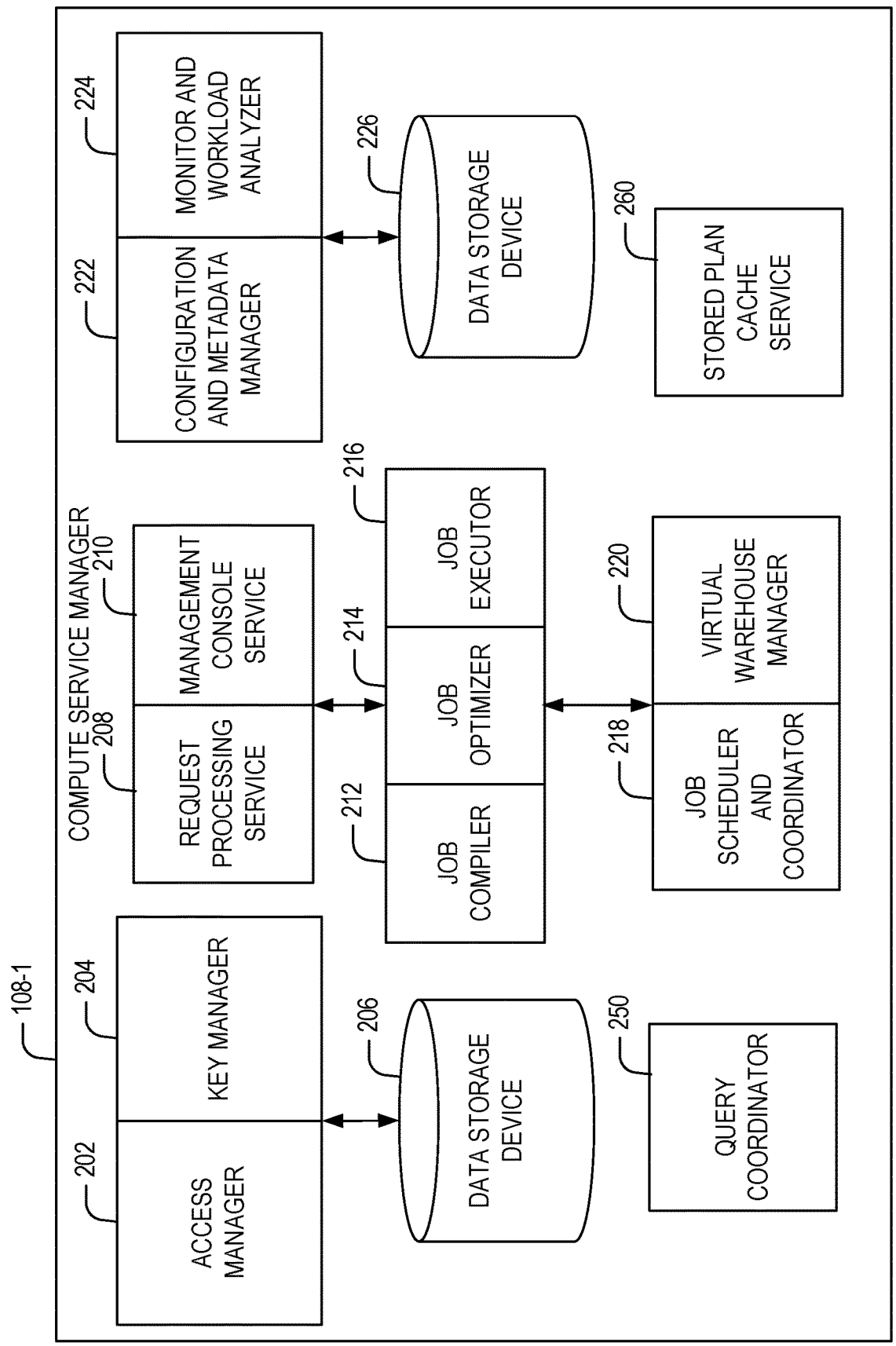
FIG. 2 is a block diagram illustrating components of a compute service manager, in accordance with some embodiments of the present disclosure.

FIG. 2 is a block diagram illustrating components of the compute service manager 108-1, in accordance with some embodiments of the present disclosure. As shown in FIG. 2, the compute service manager 108-1 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104-1). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110-1 or in a data storage device in storage platform 104-1.

A management console service 210 supports access to various systems and processes by administrators and other system managers. Additionally, the management console service 210 may receive a request to execute a job and monitor the workload on the system.

The compute service manager 108-1 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108-1.

A job scheduler and coordinator 218 sends received jobs to the appropriate services or systems for compilation, optimization, and dispatch to the execution platform 110-1. For example, jobs may be prioritized and processed in that prioritized order. In an embodiment, the job scheduler and coordinator 218 determines a priority for internal jobs that are scheduled by the compute service manager 108-1 with other "outside" jobs such as user queries that may be scheduled by other systems in the database but may utilize the same processing resources in the execution platform 110-1. In some embodiments, the job scheduler and coordinator 218 identifies or assigns particular nodes in the execution platform 110-1 to process particular tasks. A virtual warehouse manager 220 manages the operation of multiple virtual warehouses implemented in the execution platform 110-1. As discussed below, each virtual warehouse includes multiple execution nodes that each include a cache and a processor.

Additionally, the compute service manager 108-1 includes a configuration and metadata manager 222, which manages the information related to the data stored in the remote data storage devices and in the local caches (e.g., the caches in execution platform 110-1). The configuration and metadata manager 222 uses the metadata to determine which data micro-partitions need to be accessed to retrieve data for processing a particular task or job. A monitor and workload analyzer 224 oversee processes performed by the compute service manager 108-1 and manages the distribution of tasks (e.g., workload) across the virtual warehouses and execution nodes in the execution platform 110-1. The monitor and workload analyzer 224 also redistribute tasks, as needed, based on changing workloads throughout the network-based database system 102 and may further redistribute tasks based on a user (e.g., "external") query workload that may also be processed by the execution platform 110-1. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110-1, storage devices in storage platform 104-1, or any other storage device.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., at least one storage platform from storage platforms 104-1 to 104-N). In embodiments herein, each file includes data, which can be further compressed (e.g., using an appropriate data compression algorithm or technique) to reduce a respective size of such a file. For example, as discussed further herein, due to fragmentation, some data corresponding to a set of rows in a given file may be empty or sparsely populated, and compression of such rows can yield a smaller size of the file.

In some instances, fragmentation can occur at a table level where data (e.g., corresponding to a set of rows in a given source table) are stored across different micro-partitions or files associated with a given table. In comparison, when there is no fragmentation (or a low amount of fragmentation), the same set of rows are stored in a same partition or file associated with the table. It is appreciated that even in a source table with low fragmentation (e.g., based on a threshold number of rows), there can be multiple files associated with the table. Consolidated rows may also not be stored in one file, and can be stored in fewer files than where such rows were stored prior to consolidation.

In other examples, over time, modifying data can cause data fragmentation where files (or micro-partitions) are undersized or sparsely populated. As mentioned herein, each partition can correspond to a set of rows in a given source table, and a fragmented partition refers to a particular partition with one or more rows that are empty such that the source table is not as populated with data.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s). Also, when multiple tables are selected from (e.g., as part of a DML statement) into another table, the target table of such a DML statement could suffer from fragmentation.

Although the above discussion and examples are related to compute service manager 108-1, in some embodiments, similar or the same components are included in each of the compute service managers shown in FIG. 1.

As further illustrated, compute service manager 108-1 includes a query coordinator 250 and dedicated stored query plan service 260. In embodiments, query coordinator 250 performs operations for plan cache lookup of stored query plans to enable accessing stored query plans (e.g., to avoid compilation and increase performance of query execution). Stored plan cache service 260 enables storing plan cache entries that then enable sharing of such among different compute service manager instances (e.g., compute service manager 108-2 to compute service manager 108-N). The query coordinator 250 and stored plan cache service 260 are described in more detail in FIG. 4 below.

Figure 3:
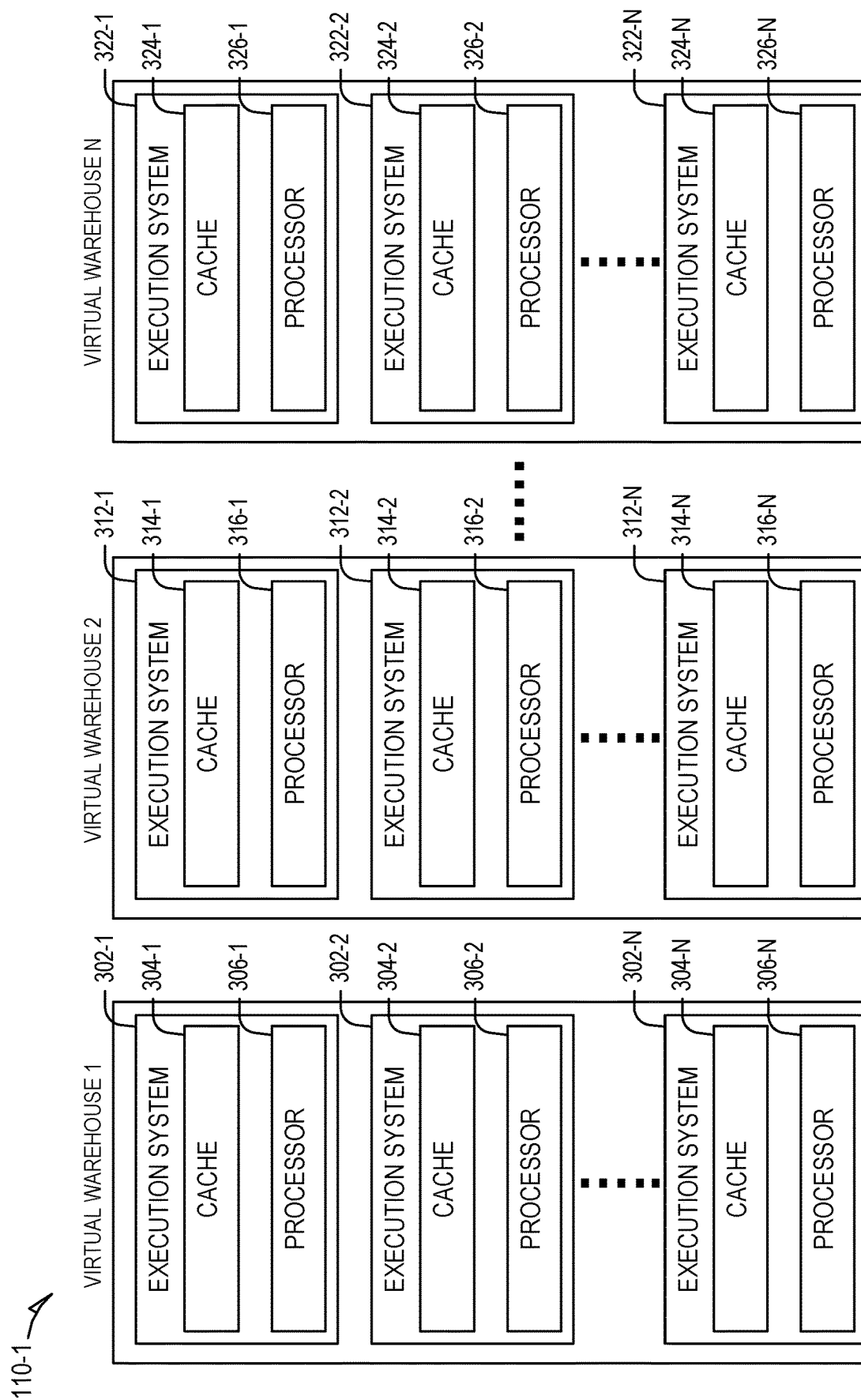
FIG. 3 is a block diagram illustrating components of an execution platform, in accordance with some embodiments of the present disclosure.

FIG. 3 is a block diagram illustrating components of the execution platform 110-1, in accordance with some embodiments of the present disclosure. As shown in FIG. 3, the execution platform 110-1 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110-1 can add new virtual warehouses and drop existing virtual warehouses in real-time based on the current processing needs of the systems and users. This flexibility allows the execution platform 110-1 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110-1, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110-1 is also fault tolerant. For example, if one virtual warehouse fails, that virtual warehouse is quickly replaced with a different virtual warehouse at a different geographic location.

A particular execution platform 110-1 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although the above discussion and examples are related to execution platform 110-1, in some embodiments, similar or the same components are included in each of the execution platforms shown in FIG. 1.

Embodiments of the subject technology provide caching for query plans through the use of a plan cache, enabling the storage of query plans (or "shared plans" or "stored plans" as referred to herein) which is described further herein. One objective of the plan cache is the use of pre-compiled plans to avoid the cost of compilation for a large number of recurring database (e.g., SQL) statements, which provides improvements for the functionality of a computer (e.g., the database system) by reducing the utilization of computing resources (e.g., processor, memory, network, and the like).

In an example, stored plans can essentially relax the sharing criteria used by a result cache to reuse a query plan compiled by a previous execution but without reusing the results themselves. In particular, stored plans provided by embodiments herein can avoid computationally expensive compilation of query plans when the underlying partitions have changed but the query is otherwise identical.

The following discussion relates to a (high level) system architecture and overview of plan cache lookup and register processes performed by components of the below described system architecture.

Figure 4:
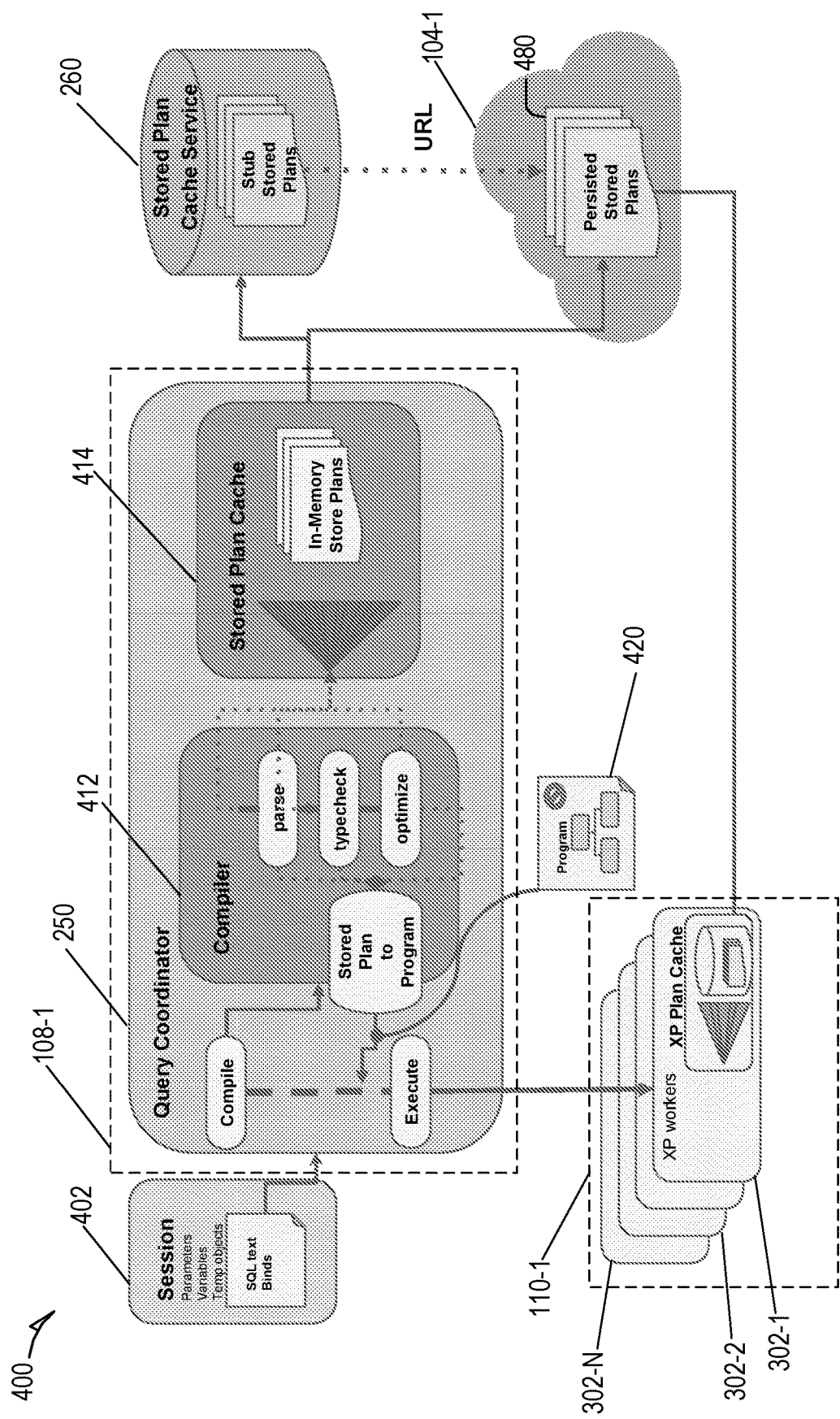
FIG. 4 is a block diagram depicting an example system architecture of a database system, in accordance with some embodiments of the present disclosure.

FIG. 4 is a block diagram depicting an example system architecture 400 of a database system, in accordance with some embodiments of the present disclosure. As illustrated, system architecture 400 includes components discussed before, including, for example, execution nodes from the execution platform 110-1, storage platform 104-1, and query coordinator 250.

As illustrated, a query (e.g., SQL statement(s)) is received from a user and binds from a session 402 (e.g., a connected session). Query coordinator 250, in an example, performs operations to populate a compilation context and invoke a compiler 412 to generate a program 420. The compilation context, for example, refers to a set of information or data including SQL text (e.g., one or more SQL statements), a bind variable(s), and a reference to the session 402 that are provided to compiler 412 to utilize during a compilation process (e.g., to generate program 420 which can be executed by a given execution node). A bind variable refers to a placeholder in a SQL statement that is replaced with a valid value or value address for the statement to execute and therefore enables the SQL statement to receive inputs or parameters during query execution.

In an implementation, program 420 is a read-only immutable program based at least in part on a query plan. In the example of FIG. 4, program 420 can be provided to one of execution node 302-1, execution node 302-2, or execution node 302-N for execution.

Compiler 412 performs operations to lookup a matching query plan in a stored plan cache 414. In an implementation, stored plan cache 414 is a local cache in memory (e.g., locally accessible by compute service manager 108-1 and not stored remotely on a cloud platform) and stores a set of stored plans in memory. In an implementation, compiler 412 can be implemented as part of query coordinator 250. Alternatively, compiler 412 can be implemented as a separate component (e.g., job compiler 212).

A set of files (or micro-partitions) to scan in executing a query may be referred to herein as a "scanset".

When an exact match is found, query coordinator 250 can perform the following operations (e.g., in conjunction with compiler 412 for some):

Check if the plan requires re-compilation due to data dependent optimization

Validate the stored plan

Check plan staleness (e.g., stale plan detection)

Compute a scanset(s) applying new pruning (if any)

Generate program (e.g., compiled query plan) based on the stored plan and the scanset(s)

As discussion of examples of data dependent optimization(s), stored plan validation, checking plan staleness, and computing the scanset(s) are included further below.

When an exact match is not found, query coordinator 250 can perform the following operations (e.g., in conjunction with compiler 412 for some):

Parse a statement(s) from the query and generate a set of tokens

Perform lookup in stored plan cache 414 for a match with a normalized statement (e.g., auto-parameterization)

When an approximate match is found, query coordinator 250 can perform the following operations (e.g., in conjunction with compiler 412 for some):

Check if the plan requires re-compilation due to data dependent optimization

Validate the stored plan

Check plan staleness (e.g., stale plan detection)

Compute a scanset(s) applying new pruning (if any)

Generate program (e.g., compiled query plan) based on the stored plan and the scanset(s)

When an approximate match is not found, query coordinator 250 can perform the following operations (e.g., in conjunction with compiler 412 for some):

Perform full compilation

Generate a compiled query plan (e.g., a stored plan) and store it in stored plan cache 414 (e.g., local in-memory cache)

Generate a program (e.g., program 420) based on the stored plan

Initiate an offline process to persist the stored plan to blob storage (e.g., a set of persisted storage plans 480 stored in storage platform 104-1) and store a stub for the stored plan in stored plan cache service 260

The following discussion relates to data dependent optimization as mentioned before.

The compiler (e.g., compiler 412) leverages a set of properties of data at a current transaction snapshot (e.g., representing a current state of such properties during the current transaction) to produce the optimized plan. In an example, such properties include the number of rows in the table, number of rows in the table after pruning with local filters, accessed files, and value distribution of a column.

Data dependent optimization is powerful but when it comes to caching a query plan for reuse, this becomes a challenge because if data properties are broken, the query plan is no longer valid.

The subject technology helps reduce the compilation time by caching and sharing previously compiled plan(s) without losing the benefit of data dependent optimization.

The following are examples of data dependent optimizations:

RowGenerator for Constant Projections

Original query: Select 1 from t1

Data property: number of rows in table t1

Rewritten query: Select 1 from rowGenerator (<num of rows in table t1>)

If the projections are constants, table scan can be replaced by a row generator that generates the dummy rows equals to the number of the original table.

Expression Constant Folding

Original query: select col0 from t1

Data property: column t1.col0 only contains a single value, for example 'a'

Rewritten query: select 'a' from t1

If the column contains a single value at a given snapshot, the column reference in the query can be replaced by the constant. This can lead to additional optimization such as replacing table scans with row generators.

Predicate Folding

Original query: select * from t1 where col0>0 Data property: all values of col0 is greater than 0

Rewritten query: select * from t1

Expression Constant Folding after Pruning

Original query: select col1 from t1 where col0>0

Data property: column t1.col1 only contains a single value, for example 'b', after pruning the base table files with predicate col0>0

Rewritten query: select 'b' from t1 where col0>0

Join Elimination

Original query: select t1.* from t1 left outer join t2 on t1.col0=t2.col0

Data property: range of t1.col0 and t2.col0 does not overlap

Rewritten query: select * from t1

By looking at the data ranges of the join keys, if there are no matching rows, the join can be eliminated.

Physical Data Type Optimization
    Original query: Select a from t1 where b>0 and t>'2021-07-22'
    Data property: all values of column 'a' fits into 1 byte (−128<=a<=127)
    Rewritten query: Select a (SB1) from t1 where b>0 and t>'2021-07-22'
        SB1 is to represent a numeric column that can fit into 1 byte.
    The execution data type of column 'a' is determined as 'SB1' which represents the numeric data type that can fit into 1 byte. Regardless of the actual storage data type of column 'a', the query execution plan can be optimized to use less space to store intermediate data of column 'a'. This reduces the memory requirements for the execution and also the time required for memory allocation calls.

The following discussion relates to plan validation to check data properties.

The plan that utilized a data dependent optimization can be still valid after that point in time as long as the data properties used for the data dependent optimization still holds. For example, if the query 'select col0 from t1' was rewritten to 'select 'a' from t1' because the column t1.col0 only contains a single value, for example 'a', the rewritten plan 'select 'a' from t1' can be used until there was an INSERT or UPDATE statement that puts a value different from 'a' into the t1.col0 column. The query plan and data properties that need to be validated are stored in order to check if the plan is still reusable at the point of plan cache lookup.

The following is an example process for the above:
1. During the first compilation of the query, whenever a data dependent optimization was performed, record the data property used for that optimization.
2. After the query compilation, store the optimized plan together with the data property in the plan cache.
3. When the new query comes in, see if there is a matching entry in the plan cache.
4. See if the plan cache entry has any data property constraint.
5. Compute the data properties of the current snapshot.
6. check if the constraints still hold.
    a. If this check fails, the plan cache entry is invalidated and the query is recompiled.
    b. If this check passes, reuse the stored plan.

In some instances, step 5 above can be costly, if the data property computation requires a lot of metadata access or involves complex computations, or if there are a lot of data properties to be checked. The data property constraints can be lifted using plan generalization described in the next section.

Figure 5:
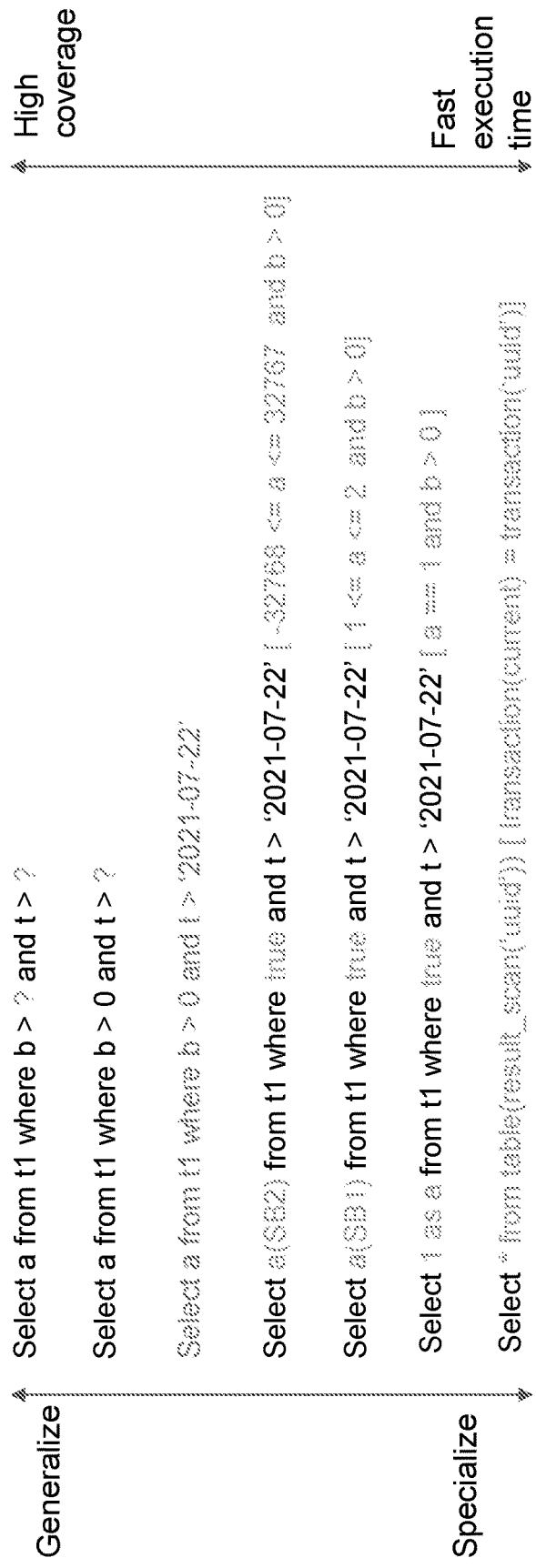
FIG. 5 is a diagram depicting an example of a compilation process with data dependent optimization(s) that can be understood as a plan specialization process, in accordance with some embodiments of the present disclosure.

FIG. 5 is a diagram depicting an example of a compilation process 500 with data dependent optimization(s) that can be understood as a plan specialization process, in accordance with some embodiments of the present disclosure.

As shown, the compilation process 500 includes various SELECT statements that can be included in a given query plan where the various statements can range from more general scope to more specialized scope which correspond to high coverage to fast execution time.

Given an example query 'select a from t1 where b>0 and t> '2021-07-22'', the more the subject technology utilizes specific data properties the plan is fine-tuned to the current data snapshot. However, this makes it more difficult to be reused and decreases the plan cache hit ratio. The extreme end of the specialization is caching the query result itself (the bottom-most query in the picture above), which will only be reusable when there are no underlying data changes.

The next level shows the query rewritten to 'select 1 as a from t1 where true and t>'2021-07-22'' which is valid until the properties 'a==1 and b>0' holds. However, the property 'a==1' may be too restrictive, since inserting any value other than '1' will invalidate the plan. If the estimated benefit of this data optimization is not greater than the benefit of using the shared plan, the subject technology can choose not to perform this data dependent optimization. Disabling the optimization for column 'a' will generalize the plan to 'select a from t1 where true and t>'2021-07-22'', with constraints 'b>0'. Although this generalized plan may be less optimal, it has a less restrictive constraint, and can increase the plan utilization.

The subject technology can decide the amount of generalization that is performed by deciding the range of an expression property (EP). The 4th and the 5th query in FIG. 5 illustrates examples in deciding the range of the expression property. Depending on the EP range of the column a ([−32768<=a<=32767] for the 4th query, [1<=a<=2] for the 5th query) the plan has different levels of optimization. The 5th plan is using SB1 type for processing column 'a' which means it will allocate 1 byte for the values of column 'a', whereas the 4th plan is using SB2, using 2 bytes for each value. The 5th plan is more optimized in the sense that it uses less memory and will likely have less memory allocation overhead, but it will be invalidated more often if the values of column 'a' exceeds the range.

The subject technology can choose to use a wider range of EP instead of the actual one to control the level of generalization, which is called EP approximation. Another reason to use a generalized plan is to reduce the overhead of checking the constraints during plan cache lookup. Taking the example from the expression constant folding after pruning mentioned above, the original query 'select col1 from t1 where col0>0' can be optimized to 'select 'b' from t1 where col0>0', using the data property 'column t1.col1 only contains a single value, for example 'b', after pruning the base table files with predicate col0>0'. To check if the property still holds, the subject technology performs a full pruning on table 't1' with predicate 'col0>0'. The min/max range or the distinct value count of the column col1 is then computed to see if the column col1 contains a single value. In some instances, this is a costly operation that involves substantial metadata lookup and computation, to be done each time a lookup is performed for the plan cache entry. To avoid such overhead, the subject technology can choose not to perform the optimization to replace t1.col1 to 'b' if the estimated benefit is not higher than the benefit of generalization.

The following discussion relates to plan de-generalization.

Figure 6:
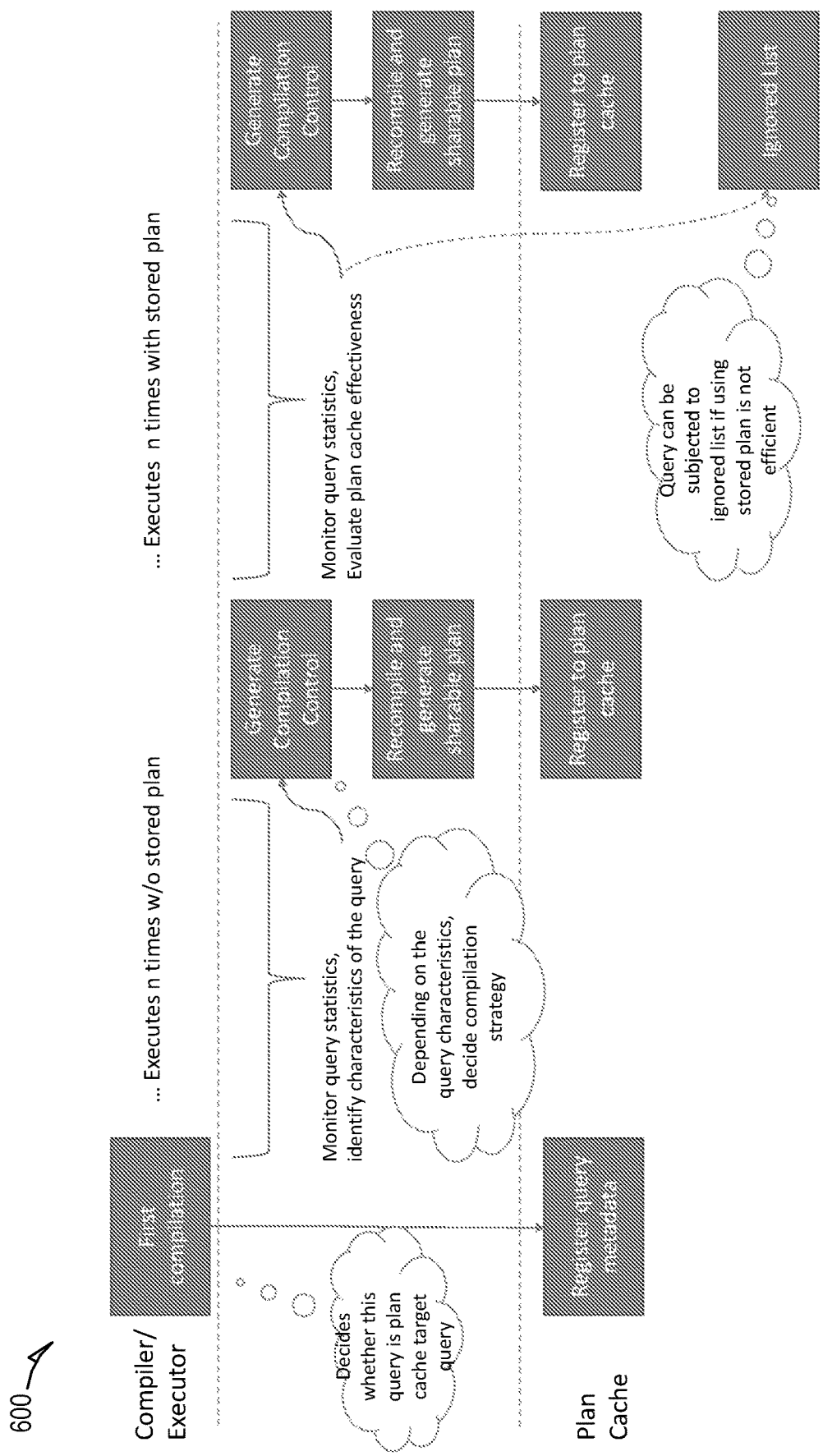
FIG. 6 is a diagram depicting an example of a set of operations illustrating a lifecycle of a query plan, in accordance with some embodiments of the present disclosure.

FIG. 6 is a diagram depicting an example of a set of operations 600 illustrating a lifecycle of a query plan, in accordance with some embodiments of the present disclosure.

In some examples, the plan generalization decision can be made after observing the workload. However, the estimation can be wrong, and it may turn out that the benefit of the data dependent optimization was underestimated, causing an overall slowdown of the average query performance. In this case, the subject technology can decide not to generalize the plan and go back to the previous behavior.

The following discussion relates to plan generalization.

Figure 7:
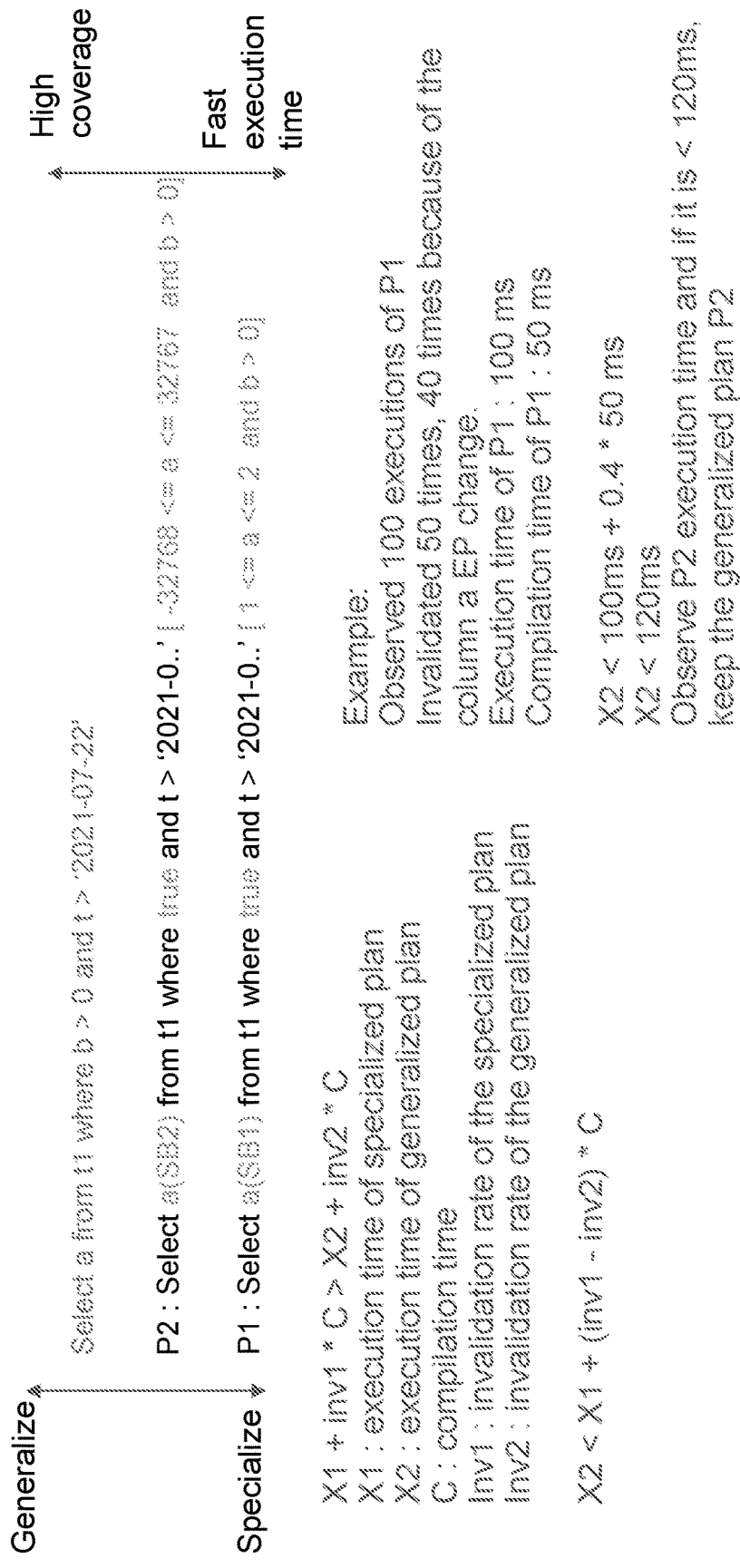
FIG. 7 is a diagram depicting an example of plan generalization, in accordance with some embodiments of the present disclosure.

FIG. 7 is a diagram 700 depicting an example of plan generalization, in accordance with some embodiments of the present disclosure.

As shown in FIG. 7, by observing the execution time, compilation time and cache utilization rate, the right level of generalization can be determined. Since the compilation time and execution time can change over time depending on the base table size, and also the cache utilization can change depending on the workload, this needs to be constantly monitored and the plan needs to be adjusted. This process can be done either eagerly (whenever the query is executed) or in the background with asynchronous manner in some implementations.

The following discussion relates to stored plan validation.

When a matching entry is found, the plan is validated, comparing the current context and the one at the point of the plan registration to guarantee correctness. If the validation fails, the invalidation logic takes place. Validation includes the following:

Consistency of the accessed objects. All referenced objects including tables, views, indexes, materialized views and UDFs are validated to check if they have any changes due to DMLs.

Roles and permissions to see if the current user has the proper permissions to execute the plan If the properties used to optimize the plan still holds, which was described above in the discussion of plan cache data dependent optimization handling. If there was any change in the parameters that can affect the plan The following discussion relates to stale plan detection.

If there were many data changes after caching the plan, the subject technology invalidates the plan because recompiling the plan will likely generate a more optimal plan with more accurate size estimation. After identifying the partitions that have been deleted and added since the last execution, the subject technology computes the gap and if the gap exceeds a certain threshold, the subject technology invalidates the plan.

Even if the query plan is not stale because of the data changes, the plan can also be invalidated if there is a high chance of getting a better plan because of added bloom filters, secondary indexes and materialized views to the accessed objects.

The following discussion relates to scanset recomputation, which is performed in some instances.

In some instances, the files to be read in a current snapshot (e.g., in a scanset) has to be recomputed. Initially, an entire list of files are loaded using a current transaction version, followed by the pruning of the files using the pruners saved in plan cache entry during the first compilation. This file pruning can be done approximately and incrementally using previous execution information to reduce the scanset computation and pruning overhead. If the gap between the original scanset and the current scanset is too wide, the plan will be invalidated as recompiling the query may lead to a more optimized plan.

The following discussion relates to an approximate match with a normalized SQL statement.

Even if the exact SQL statement does not match any of the plan cache entries, there are still chances to find the matching entry by normalizing the SQL statement. Using a lightweight parser, the subject technology generates the normalized statement based on the following:

Remove white spaces and comments
Use fully qualified names of objects
Parameterize constants The following discussion relates to parameterized query handling/auto-parameterization.

An additional improvement to increase the probability of sharing a given SQL statement, is to extract and factorize constants from this sequence. The compiler should parameterize the statement. Again, this would require parsing the SQL statement to identify constants to extract.

In an example:
SELECT count(*) FROM table WHERE column=10 is internally stored as the following:
SELECT COUNT(*) FROM TABLE WHERE COLUMN=:1

Where: 1 is a reference to the extracted parameter of the query (10).

The subject technology should probably also do something for IN-LIST to make sure the subject technology can share more readily. For example:
SELECT count(*) FROM table WHERE column in (1, 4, 2, 7) should be represented as the following:
SELECT count(*) FROM table WHERE column in:1

Where: 1 is a reference to an array of values (1, 4, 2, 7)

Each plan cache entry can have multiple plans and to decide which plan to use is based on the range of the parameters. Plans can be categorized by using plan hash, and different parameter ranges that result in different shapes of plan are stored as separate branches within the same plan cache entry.

The following discussion relates to an in-memory stored plan cache and memory management.

Each compute service manager instance has its own in-memory stored plan cache which holds the stored plan metadata information and either the serialized plan or the handler to the serialized plan (location in blob storage e.g., storage platform 104-1).

The global memory size limit of the plan cache can be configured together with the policy to limit the number of entries and memory size for each account/user.

The in-memory cache can use an LRU based cache eviction mechanism but other properties such as the compilation time of the plan, execution time of the plan, customer workload pattern information and manual user settings may affect the cache management policy.

The following discussion relates to persisting stored plans.

If the size of the serialized plan exceeds a certain threshold, the plan will be off-loaded to blob storage (e.g., storage platform 104-1) that can be accessed both from a given compute service manager (e.g., compute service manager 108-1) and an execution node (e.g., one of execution node 302-1, execution node 302-2, or execution node 302-N). The plan cache will only hold the handler (e.g., location of the blob storage) of the plan, and pass this to an execution node for the execution. In some implementations, execution nodes have their own local cache that maps a plan ID to a serialized plan to reduce the blob storage access overhead.

The following discussion relates to a stored plan cache dedicated service.

Within a compute service manager cluster there will be dedicated instances that serve as a stored plan cache dedicated service, so that the plan cache entries are collected in the centralized space and shared among different compute service manager instances. The dedicated service implements fail over logic so that even if there is a fault in the instance it can be backed up by a newly promoted instance without losing its plan cache entries. The plan metadata in the dedicated service will be persisted for this purpose, and there will be a background cleaner to remove the plans when they are too old. During a version upgrade of a compute service manager cluster, the dedicated service will invalidate the plans when they are not compatible with the newer version, and may pre-warm the frequently accessed cache entry based on the statistics.

Figure 8:
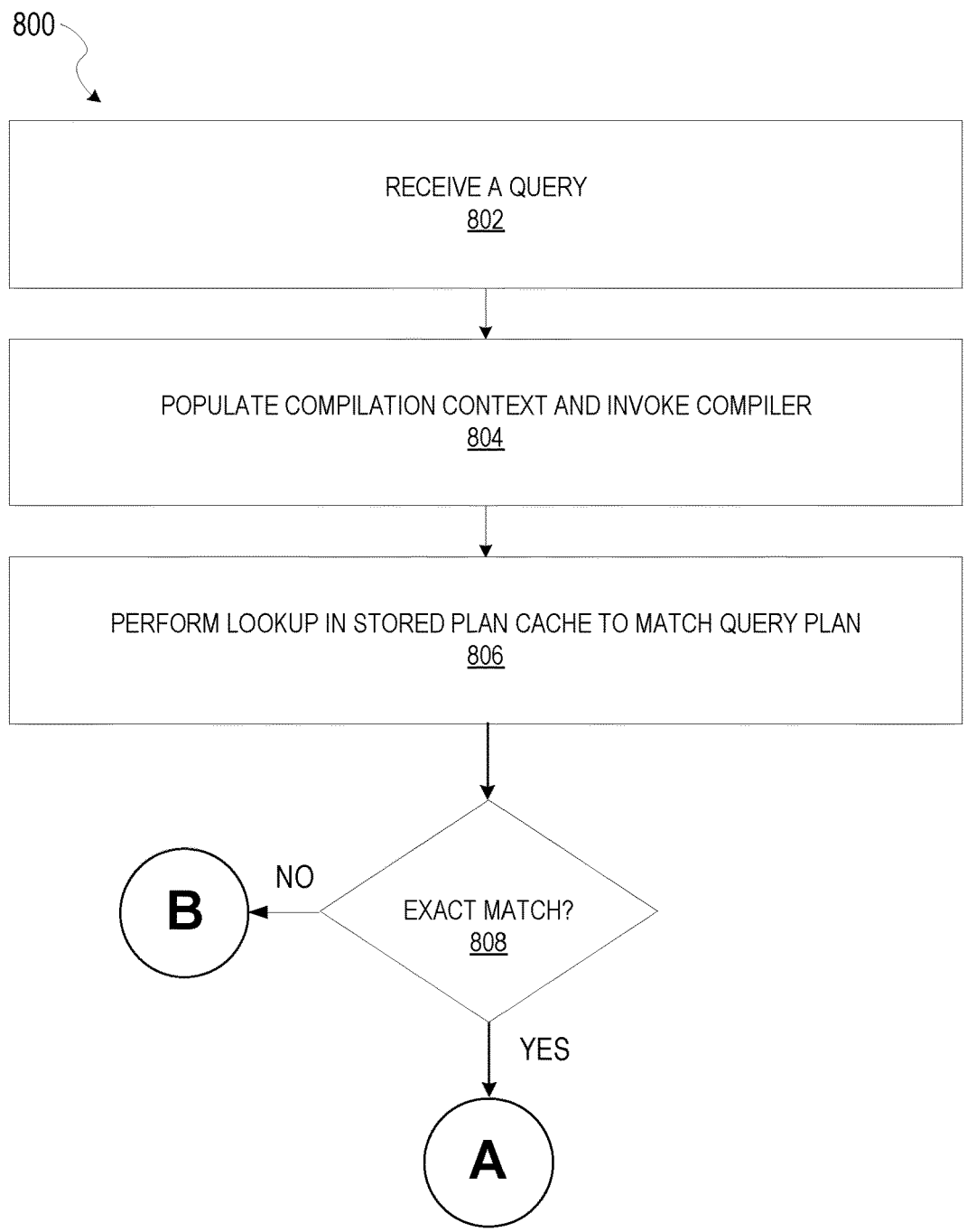
FIG. 8 is a flow diagram illustrating operations of a database system in performing a method, in accordance with some embodiments of the present disclosure.

FIG. 8 is a flow diagram illustrating operations of a database system in performing a method, in accordance with some embodiments of the present disclosure. The method 800 may be embodied in computer-readable instructions for execution by one or more hardware components (e.g., one or more processors) such that the operations of the method 800 may be performed by components of network-based database system 102. Accordingly, the method 800 is described below, by way of example with reference thereto. However, it shall be appreciated that method 800 may be deployed on various other hardware configurations and is not intended to be limited to deployment within the network-based database system 102.

At operation 802, query coordinator 250 receives a query, the query including a set of statements for performing the query.

At operation 804, query coordinator 250 populates a compilation context based at least in part the query. In an example, the compilation context includes text comprising a structured query language (SQL) statement, a bind variable, and a reference to a session. In an example, query coordinator 250 provides the compilation context to a compiler (e.g., compiler 412).

At operation 806, compiler 412 performs a lookup operation on a stored plan cache (e.g., stored plan cache 414) for an exact match based on information from the compilation context, the stored plan cache including a set of stored query plans.

At operation 808, compiler 412 determines whether the exact match of a particular query plan is found in the stored plan cache to avoid compiling the query using the compilation context. If the exact match is found, then additional operations are performed as discussed below in FIG. 9. Alternatively, if the exact match is not found, then additional operations are performed as discussed below in FIG. 10.

Figure 9:
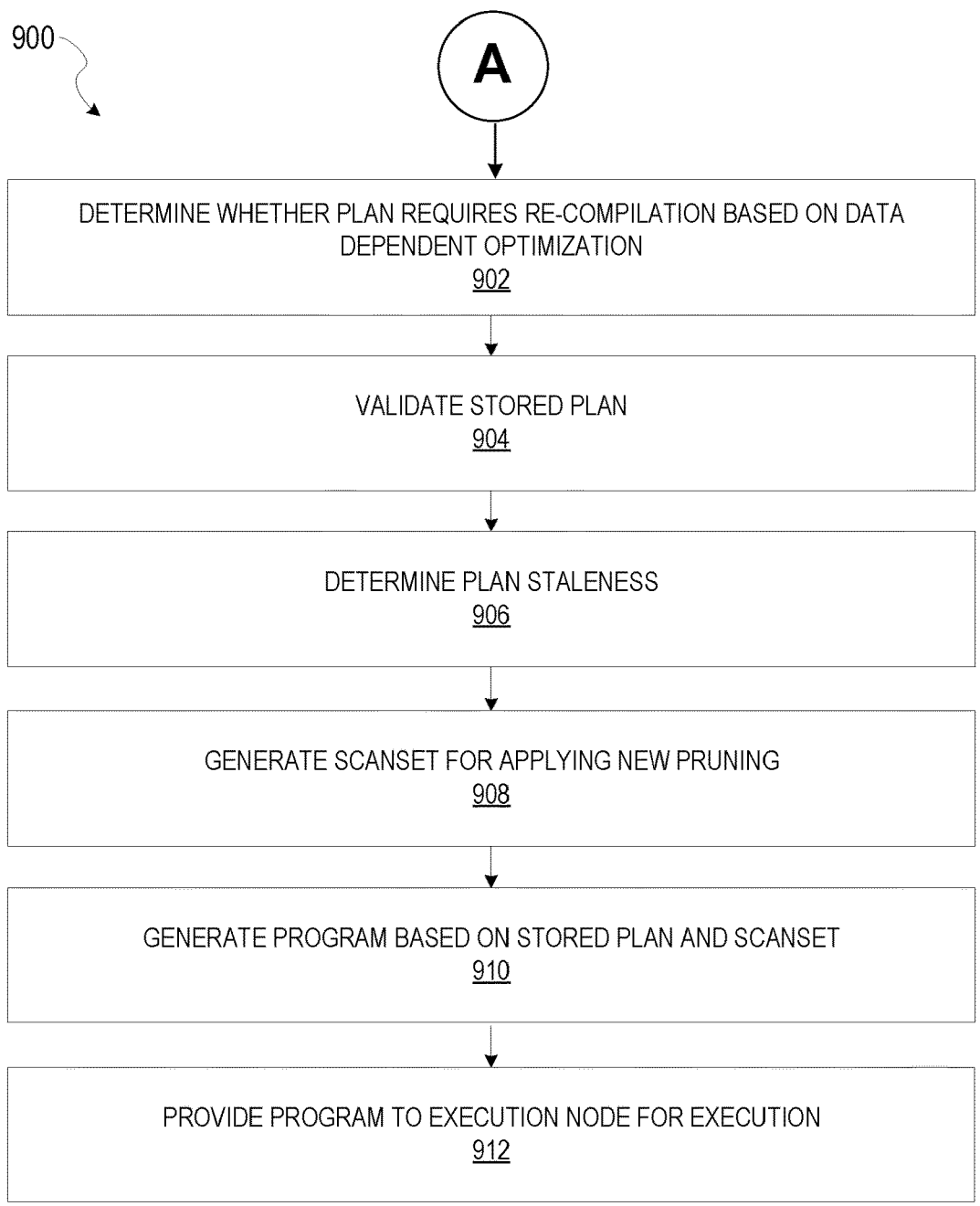
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102. Accordingly, the method 900 is described below, by way of example with reference thereto. However, it shall be appreciated that method 900 may be deployed on various other hardware configurations and is not intended to be limited to deployment within the network-based database system 102.

At operation 902, compiler 412, in response to determining an exact match (as discussed above in FIG. 8), determines whether the particular query plan requires re-compilation based on a data dependent optimization.

In embodiments, determining whether the particular query plan requires re-compilation based on the data dependent optimization comprises: compiler 412 determining whether a plan cache entry corresponding to the particular query plan includes a data property constraint, the data property constraint being utilized when the particular query plan was previously compiled and stored as part of the plan cache entry; determining a set of data properties based on current metadata associated with a set of source tables or files associated with the particular query plan; and determining whether the data property constraint still holds based on the set of data properties, wherein the data property constraint comprises a condition that is met based on a set of source tables or files associated with the particular query plan.

In embodiments, in response to the data property constraint not holding, compiler 412 invalidates the plan cache entry, and re-compiles the query based at least in part on the compilation context.

In embodiments, in response to the data property constraint holding, query coordinator 250 provides the particular query plan corresponding to the plan cache entry to an execution node for executing the query.

At operation 904, compiler 412, in response to the particular query plan not requiring re-compilation, validates the particular query plan.

At operation 906, compiler 412, in response to the particular query plan being validated, determines whether the particular query plan is stale.

At operation 908, compiler 412, in response to the particular query plan not being stale, generates a new scanset based at least in part on a set of files that were pruned during a previous compilation of the particular query plan.

At operation 910, compiler 412 generates a program (e.g., program 420) based at least in part on the new scanset.

At operation 912, query coordinator 250 provides the program to an execution node (e.g., execution node 302-1) for executing the particular query plan.

Figure 10:
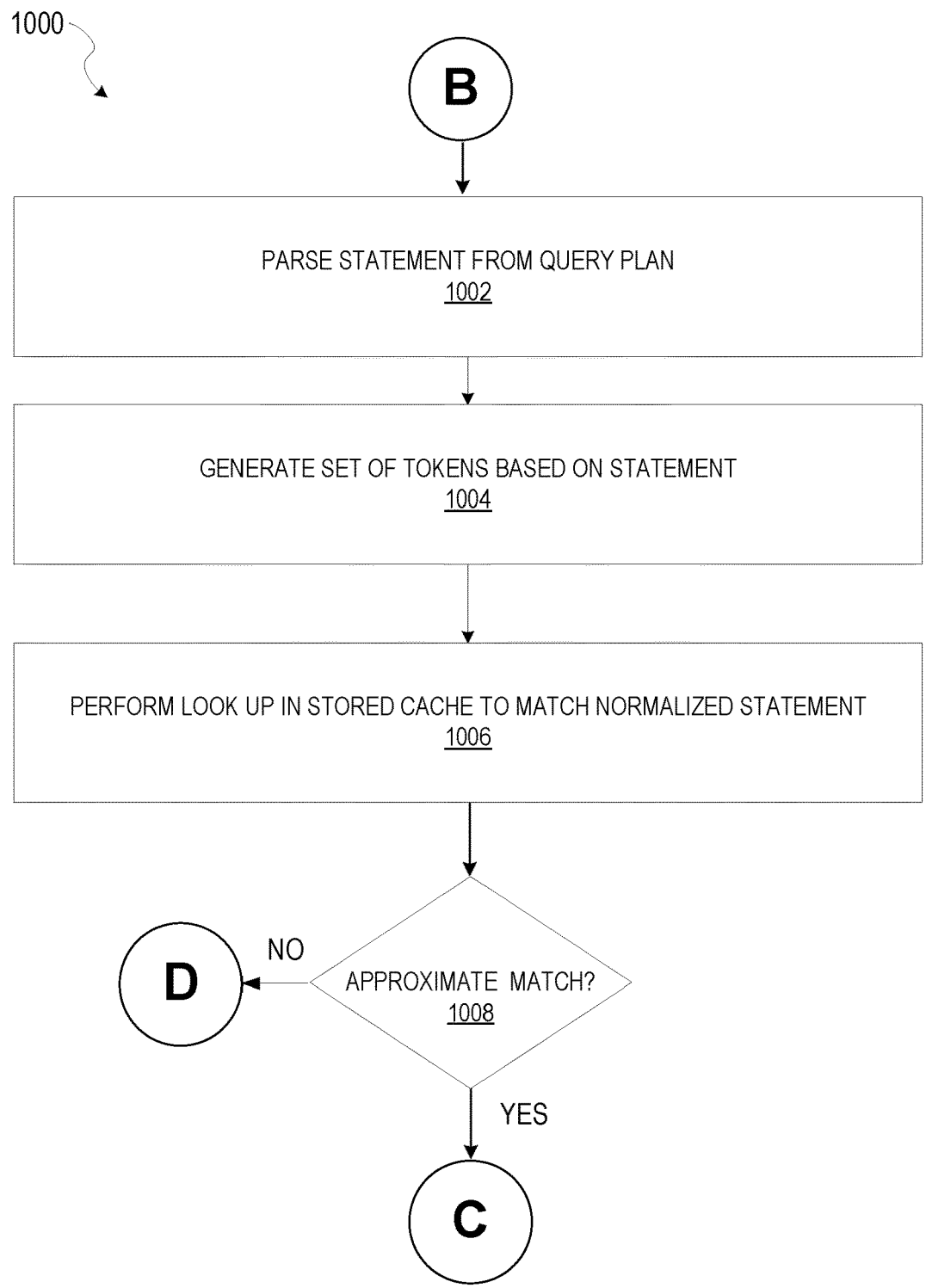
FIG. 10 is a flow diagram illustrating operations of a database system in performing a method, in accordance with some embodiments of the present disclosure.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102. Accordingly, the method 1000 is described below, by way of example with reference thereto. However, it shall be appreciated that method 1000 may be deployed on various other hardware configurations and is not intended to be limited to deployment within the network-based database system 102.

At operation 1002, compiler 412, in response to not determining the exact match, parses the set of statements from the query.

At operation 1004, compiler 412 generates a set of tokens based on the parsing.

At operation 1006, compiler 412 performs a second lookup operation in the stored plan cache based at least in part on the set of tokens to determine an approximate match of a normalized statement corresponding to a second particular query plan in the stored plan cache.

In embodiments, compiler 412 generates the normalized statement corresponding to the second particular query plan, the second particular query plan including a second set of statements, the generating comprising: removing white spaces from the set of statements; removing a set of comments from the set of statements, the set of comments comprising at least one annotation or textual information that is ignored by a compiler; determining a set of fully qualified names of objects; and parameterizing a set of constants from the set of statements.

At operation 1008, compiler 412 determines if there is the approximate match. If the approximate match is found, then additional operations are performed as discussed below in FIG. 11. Alternatively, if the approximate match is not found, then additional operations are performed as discussed below in FIG. 12.

Figure 11:
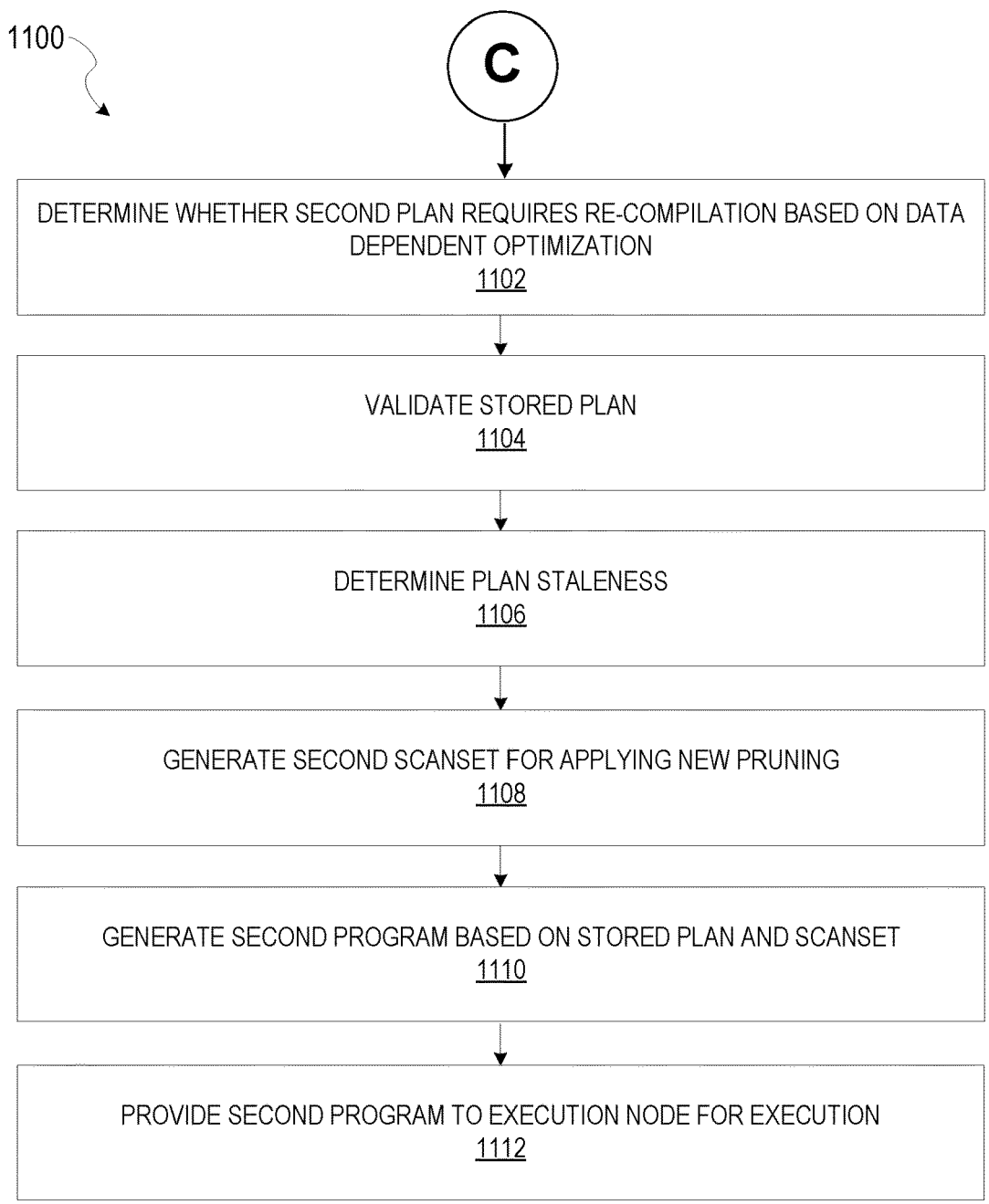
FIG. 11 is a flow diagram illustrating operations of a database system in performing a method, in accordance with some embodiments of the present disclosure.

FIG. 11 is a flow diagram illustrating operations of a database system in performing a method, in accordance with some embodiments of the present disclosure. The method 1100 may be embodied in computer-readable instructions for execution by one or more hardware components (e.g., one or more processors) such that the operations of the method 1100 may be performed by components of network-based database system 102. Accordingly, the method 1100 is described below, by way of example with reference thereto. However, it shall be appreciated that method 1100 may be deployed on various other hardware configurations and is not intended to be limited to deployment within the network-based database system 102.

At operation 1102, compiler 412, in response to the second lookup operation determining the approximate match, determines whether the second particular query plan requires re-compilation based on a second data dependent optimization.

At operation 1104, compiler 412, in response to the second particular query plan not requiring re-compilation, validates the second particular query plan.

At operation 1106, compiler 412, in response to validating the second particular query plan, determines whether the second particular query plan is stale.

At operation 1108, compiler 412, in response to the second particular query plan not being stale, generates a new second scanset based at least in part on a second set of files that were pruned during a previous compilation of the second particular query plan.

At operation 1110, compiler 412 generates a second program based at least in part on the new second scanset.

Figure 12:
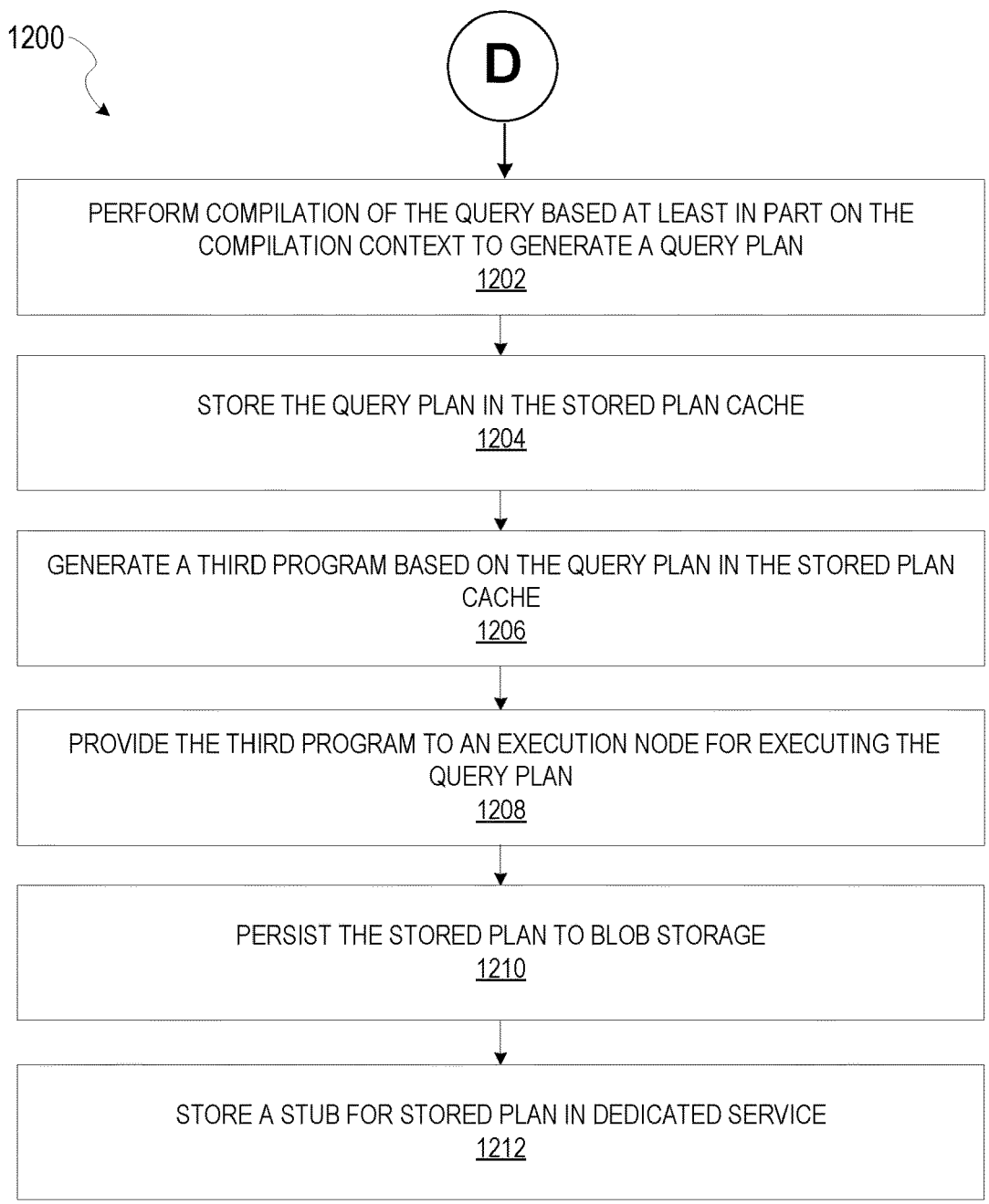
FIG. 12 is a flow diagram illustrating operations of a database system in performing a method, in accordance with some embodiments of the present disclosure.

At operation 1112, query coordinator 250 provides the second program to an execution node for executing the second particular query plan FIG. 12 is a flow diagram illustrating operations of a database system in performing a method, in accordance with some embodiments of the present disclosure. The method 1200 may be embodied in computer-readable instructions for execution by one or more hardware components (e.g., one or more processors) such that the operations of the method 1200 may be performed by components of network-based database system 102. Accordingly, the method 1200 is described below, by way of example with reference thereto. However, it shall be appreciated that method 1200 may be deployed on various other hardware configurations and is not intended to be limited to deployment within the network-based database system 102.

At operation 1202, compiler 412, in response to the second lookup operation not determining the approximate match, performs a compilation of the query based at least in part on the compilation context to generate a query plan, storing the query plan in the stored plan, At operation 1204, compiler 412 stores the query plan in the stored plan cache (e.g., stored plan cache 414).

At operation 1206, compiler 412 generates a third program based on the query plan in the stored plan cache.

At operation 1208, query coordinator 250 provides the third program to an execution node (e.g., execution node 302-1) for executing the query plan.

At operation 1210, query coordinator 250 stores the query plan in blob storage, the blob storage being provided by a cloud storage platform (e.g., storage platform 104-1).

At operation 1212, query coordinator 250 stores a stub for the query plan in a stored plan cache service (e.g., the stored plan cache service 260).

The following discussion relates to a multi-phase caching framework that provides an infrastructure for performing modifications to a compilation code path for the purpose of plan caching, including specialization or generalization, in a way such that minimizes regressions caused by such modifications both for queries using and queries not using the cached plans.

In an implementation, the subject technology enables different types of modifications that can register into various hook points in the framework to perform different types of customized modifications.

Multi-phase caching is enabled for all features requiring modification to the compilation code path.

The stored plan cache 414 often has to make modifications to a program produced by the compiler. This can be needed for various reasons:
1) Without modifications sometimes the cached plan is not reusable in subsequent executions. Examples include queries containing binds, swapping in scansets, and the like.
2) Modifications can often help provide generalizations that increase the hit ratio of plans. Examples include auto-parameterization and physical type generalization.

Since these modifications deviate from what is produced by the compiler 412 otherwise, there are often risks in producing programs of that particular shape, including various types of regressions.

Also, in a steady state, when encountering a query that is not cached, this can be a very good indicator that the query is not cacheable. Hence, this scenario is the starting assumption (e.g., the query, not being in the cache, indicates that the query is likely not cacheable) of a cache operation.

During query compilation, verification is performed against that assumption, and checks whether 1) the query is cacheable to begin with, and 2) if it is cacheable, what generalization or specialization would be needed; but the actual transformations are not performed.

In subsequent executions of the query, these transformations could be applied and gradually refined, until a version is reached where a full program can be cached and used.

Multi-phase caching is a mechanism that enables adaptive disabling of targeted compiler optimizations with the goal of generating more shareable plans. These disabled optimizations are referred to as "generalizations" herein.

In an example, these two phases of multi-phase caching are:
1. Phase 1: Compile the query, and keep track of any required generalizations. If the query is determined to be cacheable (factoring in the unresolved generalizations), then a dummy entry is registered into the stored plan cache service 260 with the corresponding generalizations.
2. Phase 2: On plan lookup, retrieval of the dummy entry is performed from the stored plan cache service 260 with the generalizations attached. At this point, the statistics of the first execution are checked. If the query meets performance thresholds with the respective optimizations disabled, then the query is compiled with the required generalizations applied (e.g., skipping certain steps/transformations in the compiler).

The multi-phase caching infrastructure provides the stored plan cache service 260 a mechanism to take a dedicated compilation code path only when we have reasonable confidence that the query is cacheable, compilable (e.g., can be compiled), and meets performance thresholds with optimizations disabled.

However, there are potential performance implications that could lead to increased compilation times for queries in the first two phases (and where the 3rd phase and any subsequent phases should result in cache hits).

This is a result of the additional steps that are performed to manage and apply generalizations. In practice, such steps are lightweight thereby making the cost (e.g., in utilization of computing resources, and the like) effectively negligible.

Figure 13:
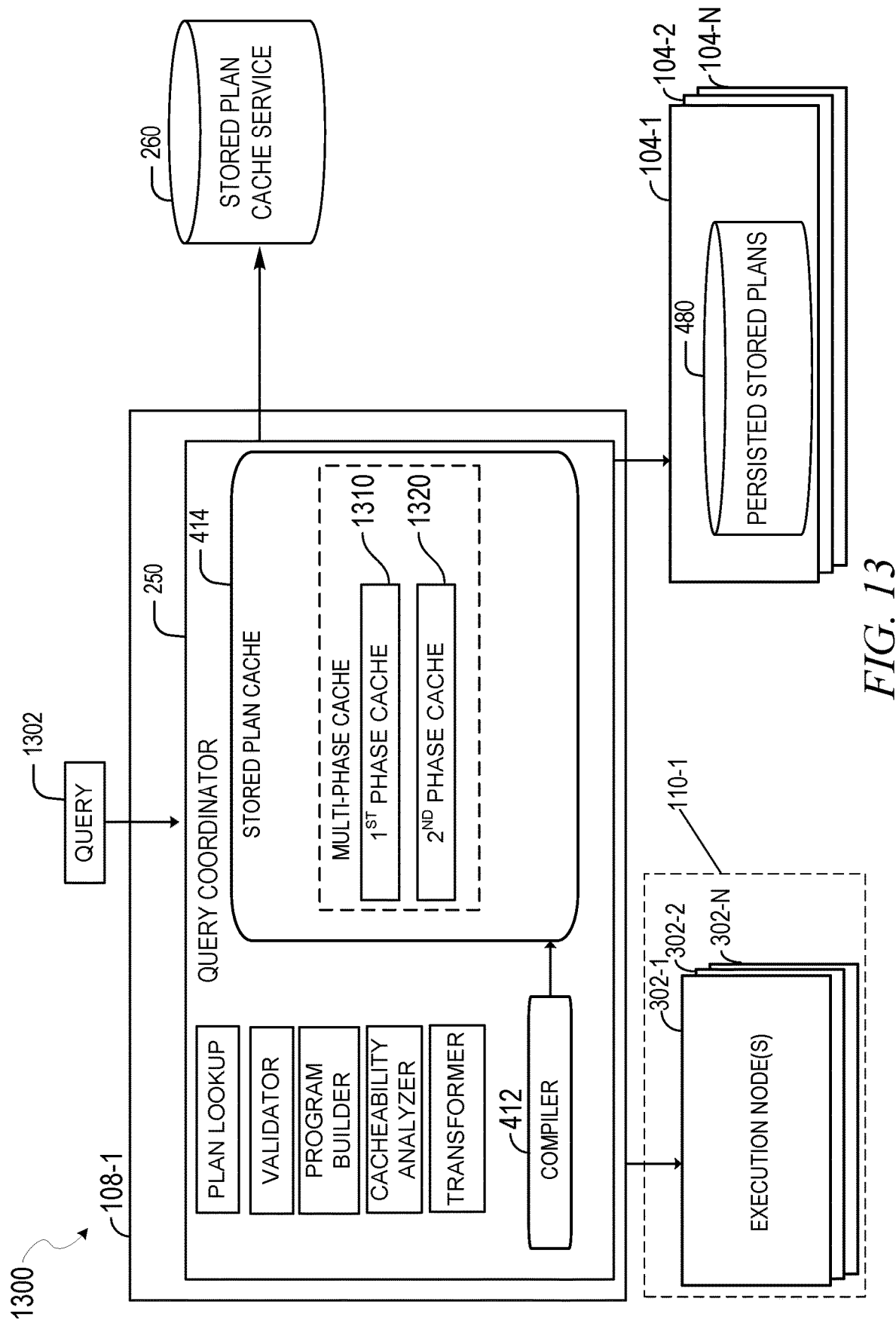
FIG. 13 is a block diagram depicting an example system architecture of a database system, in accordance with some embodiments of the present disclosure.

FIG. 13 is a block diagram depicting an example system architecture of a database system, in accordance with some embodiments of the present disclosure. In the example of FIG. 13, system architecture 1300 includes some of the same components (with some modifications discussed below) as discussed before in FIG. 4 above.

As illustrated, system architecture 1300 includes components discussed before, including, for example, compute service manager 108-1, storage platform 104-1 to storage platform 104-N, stored plan cache service 260, and query coordinator 250. As discussed below, query coordinator 250 and its components therein enable a multi-phase plan caching framework for a multi-phase cache that provides infrastructure to register new transformations. Such a framework includes the following in an implementation:

- Multiple "lookup" stages during query compilation where different levels of information are available. Optimizations could choose to integrate with one or more of the following stages:
  - First lookup occurs (e.g., provided by a lookup component discussed below) before compilation.
  - Second lookup (e.g., provided by the lookup component) occurs after parsing.
- Extensible components to be controlled by each generalization/optimization:
  - Validation logic for various optimizations (e.g., provided by a validator component discussed below).
  - Logic that actually applies the transformations (e.g., provided by a transformer component discussed below).

As shown, system architecture 1300 includes compute service manager 108-1. In the example of FIG. 13, compute service manager 108-1 includes query coordinator 250 which receives query 1302. Query coordinator 250 includes compiler 412 and stored plan cache 414. Further, stored plan cache 414 in this example includes first phase cache 1310 and second phase cache 1320. In this example, a multi-phase cache is implemented including first phase cache 1310 and second phase cache 1320. A discussion of these components is provided in the following description.

As illustrated, query coordinator 250 includes various components such as a plan lookup component for performing a plan lookup in stored plan cache 414, a validator component for validating query plans, a program builder component for component for performing filing pruning and recomputing execution node parameters, a cacheability analyzer to determine whether a program (e.g. compiled query plan) is cacheable (e.g., whether the query plan was compiled successfully, EPs are generalized, folding binds are avoided, and the like), and a transformer providing logic to apply transformations (discussed further herein). Each of these components can access and communicate with compiler 412 and stored plan cache 414 (and its components therein).

In an implementation, the multi-phase caching framework (and its components thereof) provide fine tuning capabilities on whether to cache a plan, and which plan to cache. All plan cache queries are initially applied to the multi-phase caching infrastructure where a set of optimizations can be performed. Example optimizations include:

- Physical type generalization
- Bind value related program modifications
- Disabling certain data dependent optimizations
- Auto-parameterization This approach is safer for rolling out new changes to stored plan cache 414, since only target queries are impacted.

The following discussion relates to example operations performed at different stages of the multi-phase caching framework.

- First compilation
  - Collect information
    - Determine whether the query is cacheable: Both cacheable and non-cacheable decisions could be remembered.
    - Determine what kind of optimization and generalization is this query qualified for
      - Validation checks for whether the particular optimization applies to this query.
- Second compilation
  - Apply the optimization and generalization identified during the first phase to produce the cached plan/program.
- Third execution
  - Skip compilation and use the cached version.

This does not have to be restricted to 3 stages—the "observation period" can be longer if more information is needed on the level of generalization. Generalization could also be further informed by the hit ratio metric from the cache.

- Auto-parameterization implementation
  - Multiple stages of lookup to check for various levels of cache key
  - Support for environment functions
  - Auto-parameterization of literal values
  - Auto-parameterized query hash
    - Key computation can be decoupled from information recording. The hash can be computed earlier, and the relevant information can be captured later, such as the fact that there is an environment function that needs to be recorded.
- Support for different types of generalizations, including environment functions.

In an implementation, auto-parameterization is run immediately after parsing (before type checking) and is applied to all queries. This includes invalid queries that will eventually fail compilation or uncacheable queries, and can result in two primary problems: 1) uncacheable queries, and 2) directly auto-parameterizing an eligible query can be dangerous as bind as an SQL language feature is disallowed in certain query types.

Embodiments of the subject technology provide techniques for integrating auto-parameterization with two-phased caching such that a query will have the appropriate generalizations set when the query can be auto-parameterized.

These generalizations (part of the dummy entry) are stored in the multi-phase cache when the query passes the following checks:
Query passes compilation
Query passes cache criteria
Query has literals and/or functions eligible for auto-parameterization
Query is still valid after auto-parameterization. The query must pass validation checks for binds without being auto-parameterized.

By leveraging multi-phased caching, the subject system can effectively auto-parameterize only queries that pass compilation and are cacheable, rather than attempting to auto-parameterize all queries. As a result, full confidence is obtained regarding the validity of the query if the system were to auto-parameterize it.

This resolves the following problems.
1. Only stored plan cache 414 supported queries will be auto-parameterized→Lowered risk and reduced the blast radius, queries outside the domain of stored plan cache 414 will not be impacted.
2. Queries will be auto-parameterized only if they pass compilation and pass bind validation→confidence of query validity before attempting to auto-parameterize.

The following discussion relates to example implementations.

The first time a query is compiled (Phase 1), the subject system produces a parameterized query hash and keeps track of whether it qualifies for auto-parameterization. If the query passes compilation, is cacheable, and qualifies for auto-parameterization, then the subject system inserts a dummy entry into the plan cache with the generalization for auto-parameterization set to true.

In an example, checking for auto-parameterization qualification include two parts:
1. Query contains literals and/or environment functions eligible for auto-parameterization
2. Query would still be valid after auto-parameterization (e.g., statement is legal with binds, number of binds is not exceeded).

The second time the query is compiled (Phase 2), the subject system produces a parameterized query hash, fetches the dummy entry from cache, auto-parameterize the parse tree, and cache the generalized plan.

From the third time onwards, the subject system produces a parameterized query hash and fetches the generalized plan from the cache. The idea is that phase 1 is responsible for all validation logic whereas phase 2 is responsible solely for the auto-parameterization transformation process.

The subject system will store the parameterized query hash in a separate field such that the subject system does not interfere with the existing query hash. An "AutoParameterization Visitor" implementation (e.g., an auto-parameterization process as referred to herein) is divided into two versions: Partial and Full which are discussed below.

Partial: This version will be run in all phases and is responsible for:
Producing the parameterized query hash
Initializing the generalization in phase 1

The goal of this process is to make queries that potentially qualify for auto-parameterization produce the same query hash, such that they will map to the same shared plan. If the query eventually passes compilation and is cacheable, then the subject system registers the plan under the parameterized query hash. This version also starts building the generalization requirements in phase 1, and propagates it through the rest of compilation for additional processing.

This can be implemented by traversing the parse tree and adding additional fields to each node that marks if the node can be auto-parameterized. At this stage, the subject system can also track the eligible nodes by creating new generalizations. Then, computeQueryHashFromParseTree (e.g., compute query hash from parse tree function) can be modified to account for these fields when generating the query hash. This enables computing a query hash as if the query were auto-parameterized, without actually mutating the parse tree itself and modifying the generated plan.

For example, the query select * from t1 where col1>=2 produces a parameterized query hash that matches the query select * from t1 where col1>=?, without changing the original query itself. Thus in Phase 1, the compiled query plan will correspond to the non-parameterized query, whereas the hash will correspond to the auto-parameterized query. This is important because if the query is eventually determined to be uncacheable, the query plan will be left completely unchanged.

Example

| Input | select * from t1 where col1 >= 2 |
|---|---|
| Output | SqlText = select * from t1 where col1 >= 2 |
| | SqlParseTree = corresponds to select * from t1 where col1 >= 2 SqlTextHash = hash ( select * from t1 where col1 >= 2 ) ParameterizedQueryHash = hash ( select * from t1 where col1 >= ? ) SdlBindMap = { } |

Full: This version will run in the 2nd and 3+ phases. The main operations include:
Mutating the parse tree to include binds, such that the generated query plan corresponds to the parameterized query. This query plan is shareable for all queries with the same parameterized query hash.
Mutating/updating the bind map to reflect parse tree changes.

In an example, this can be implemented by traversing the parse tree, and replacing eligible constants and environment functions with the corresponding bind definitions. During this traversal, the subject system also updates the bind map corresponding bind values. The full auto-parameterization process will be run immediately after phase 2 lookup succeeds.

Both the partial and full version will use the same set of rules to determine if a node in the parse tree qualifies for auto-parameterization. In essence, the full version performs the actual "auto-parameterization" while the partial version only "auto-parameterizes" the query text.

Example

| Input | select * from t1 where col1 >= 2 |
|---|---|
| Output | SqlText = select * from t1 where col1 > =? |
| | SqlParseTree = corresponds to select * from t1 where col1 >= ? SqlTextHash = hash ( select * from t1 where col1 >= ? ) ParameterizedQueryHash = hash ( select * from t1 where col1 >= ? ) SdlBindMap = {SFAP_1: 2} |

Another topic to discuss is the process of building the generalization requirements. At its core, the generalizations are simply Boolean flags that indicate whether the query (1) Contains nodes eligible for auto-parameterization and (2) Will still be valid after auto-parameterization.

The generalizations are only built in phase 1, and should encapsulate all validation logic pertaining to auto-parameterization. In phase 2, no more validation should occur, and the sole purpose of this phase is to carry out the actual auto-parameterization of the query.

In an implementation, the following table outlines where generalizations could be modified, and how they are changed.

| Where | How |
|---|---|
| Partial Auto-Parameterization Visitor | The generalizations will be initialized if any eligible nodes are found. |
| Bind Validation | During the various bind validation stages, the subject system checks the generalizations and preemptively validates the query. This process ensures that the query is still valid after auto-parameterization (that will occur in phase 2). If the validations fail, then the generalizations will be cleared. This means compilation will proceed as normal, and the non-parameterized query plan will be cached. This stage is skipped for literals, as no validation is necessary. |

The following discussion relates to example processes for a proposed code path for auto-parameterization (with full and partial visitors). In the discussion below, Phase 1 lookup (step 1) in the 2nd and 3rd phase of two-phase caching will succeed if the parameterized query hash is the same as the non-parameterized hash.

Figure 14:
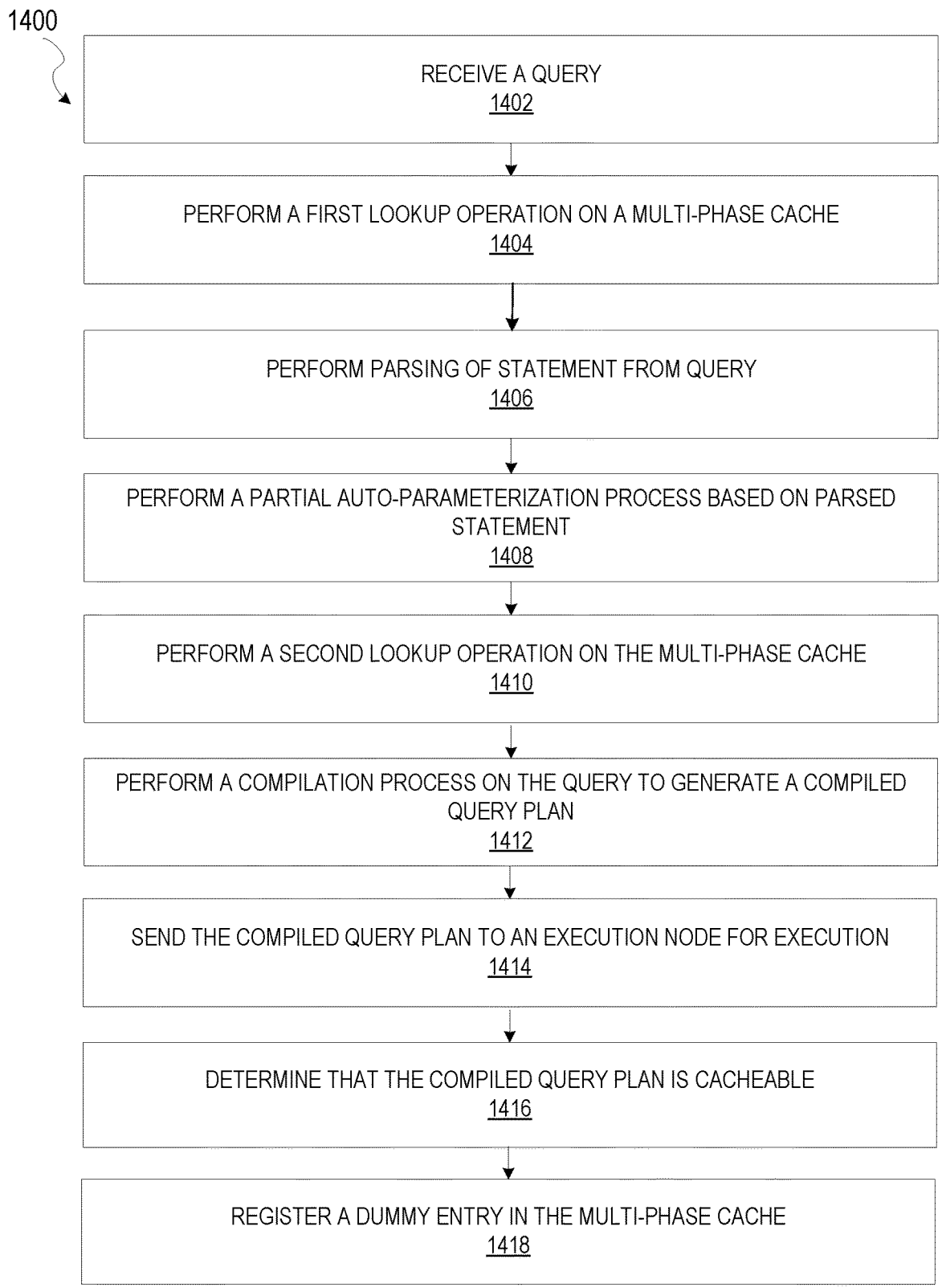
FIG. 14 is a flow diagram illustrating operations of a database system in performing a method, in accordance with some embodiments of the present disclosure.

FIG. 14 is a flow diagram illustrating operations of a database system in performing a method, in accordance with some embodiments of the present disclosure. The method 1400 may be embodied in computer-readable instructions for execution by one or more hardware components (e.g., one or more processors) such that the operations of the method 1400 may be performed by components of network-based database system 102. Accordingly, the method 1400 is described below, by way of example with reference thereto. However, it shall be appreciated that method 1400 may be deployed on various other hardware configurations and is not intended to be limited to deployment within the network-based database system 102.

The operations described below relate to a discussion of a first phase of an example compiler code path.

At operation 1402, query coordinator 250 receives a query, the query including a statement for performing the query.

At operation 1404, compiler 412 performs a first lookup operation on a multi-phase cache based on the query.

At operation 1406, compiler 412 performs, in response to a first cache miss of the multi-phase cache, parsing of the statement from the query.

At operation 1408, compiler 412 performs a partial auto-parameterization process based on the parsed statement, the partial auto-parameterization process generating a parameterized query hash and initializing a set of generalizations.

At operation 1410, compiler 412 performs a second lookup operation on the multi-phase cache based on the partial auto-parameterization process.

At operation 1412, compiler 412 performs, in response to a second cache miss of the multi-phase cache, a compilation process on the query to generate a compiled query plan.

At operation 1414, query coordinator 250 sends the compiled query plan to an execution node for execution.

At operation 1416, query coordinator 250 determines that the compiled query plan is cacheable.

At operation 1418, query coordinator 250 registers, in response to the compiled query plan being cacheable, a dummy entry in the multi-phase cache (e.g., first phase cache 1310).

Figure 15:
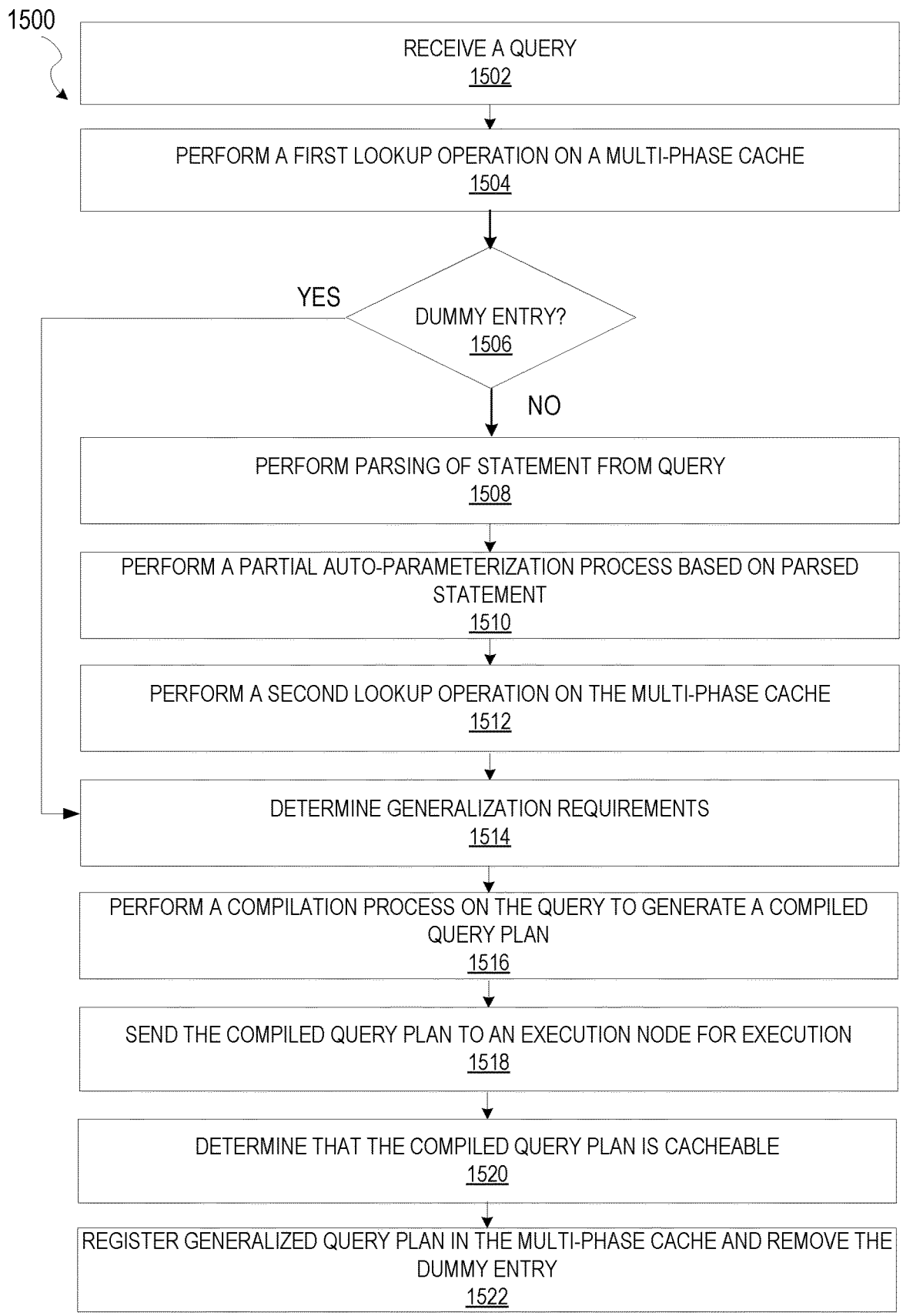
FIG. 15 is a flow diagram illustrating operations of a database system in performing a method, in accordance with some embodiments of the present disclosure.

FIG. 15 is a flow diagram illustrating operations of a database system in performing a method, in accordance with some embodiments of the present disclosure. The method 1500 may be embodied in computer-readable instructions for execution by one or more hardware components (e.g., one or more processors) such that the operations of the method 1500 may be performed by components of network-based database system 102. Accordingly, the method 1500 is described below, by way of example with reference thereto. However, it shall be appreciated that method 1500 may be deployed on various other hardware configurations and is not intended to be limited to deployment within the network-based database system 102.

The operations described below relate to a discussion of a second phase of an example compiler code path, which is performed after the first phase described above in FIG. 14.

At operation 1502, query coordinator 250 receives a second query, the second query including a second statement for performing the second query.

At operation 1504, compiler 412 performs the first lookup operation on the multi-phase cache based on the second query.

At operation 1506, if compiler 412 makes a determination that a cache hit has occurred based on the first lookup operation locating the dummy entry discussed in FIG. 14, the method 1500 continues at operation 1514. Alternatively, in response to a cache miss for the dummy entry, the method 1500 continues to the operation 1508.

At operation 1508, compiler 412 performs, in response to a particular cache miss of the multi-phase cache based on the dummy entry, parsing of the second statement from the second query.

At operation 1510, compiler 412 performs the partial auto-parameterization process based on the parsed second statement.

At operation 1512, compiler 412 performs the second lookup operation on the multi-phase cache based on the partial auto-parameterization process.

At operation 1514, compiler 412 determines a set of generalization requirements, the determining based on performing a full auto-parameterization process that generates a modified parse tree with the set of generalization requirements being applied. In an embodiment, determining the set of generalization requirements is based on performing a full auto-parameterization process that generates a modified parse tree with the set of generalization requirements being applied.

At operation 1516, compiler 412 performs the compilation process on the second query to generate a compiled second query plan, the compilation process using the set of generalization requirements.

At operation 1518, compiler 412 sends the compiled second query plan to the execution node for execution.

At operation 1520, query coordinator 250 determines that the compiled second query plan is cacheable.

At operation 1522, query coordinator 250 registers, in response to the compiled query plan being cacheable, a generalized query plan in the multi-phase cache (e.g., second phase cache 1320, and removes the dummy entry from the multi-phase cache.

Figure 16:
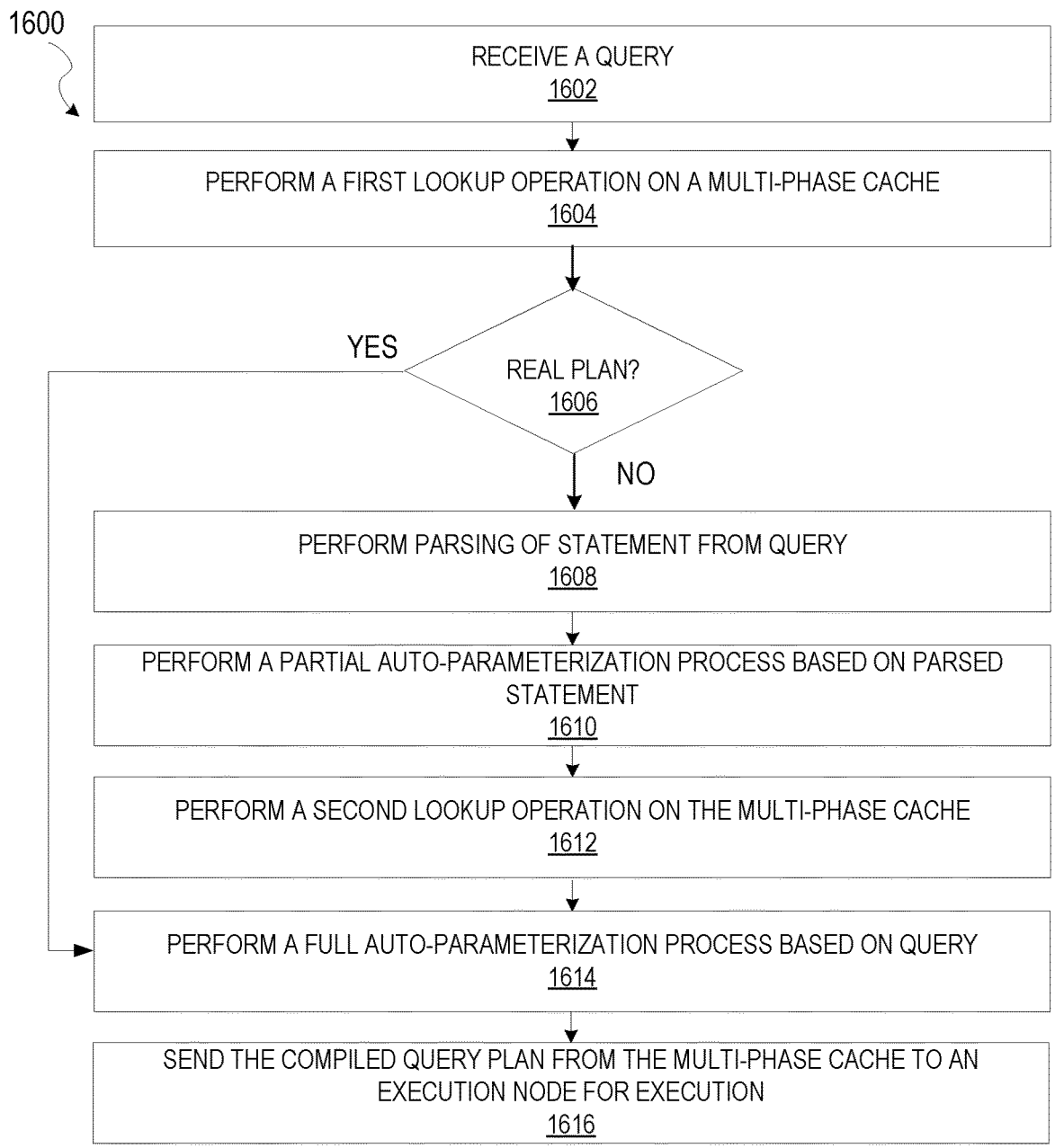
FIG. 16 is a flow diagram illustrating operations of a database system in performing a method, in accordance with some embodiments of the present disclosure.

FIG. 16 is a flow diagram illustrating operations of a database system in performing a method, in accordance with some embodiments of the present disclosure. The method 1600 may be embodied in computer-readable instructions for execution by one or more hardware components (e.g., one or more processors) such that the operations of the method 1600 may be performed by components of network-based database system 102. Accordingly, the method 1600 is described below, by way of example with reference thereto. However, it shall be appreciated that method 1600 may be deployed on various other hardware configurations and is not intended to be limited to deployment within the network-based database system 102.

The operations described below relate to a discussion of a third phase of an example compiler code path, which is performed after the first and second phases described above in FIG. 14 and FIG. 15.

At operation 1602, query coordinator 250 receives a third query, the third query including a third statement for performing the third query.

At operation 1604, compiler 412 performs the first lookup operation on the multi-phase cache based on the third query.

At operation 1606, if compiler 412 determines that a first cache hit of the multi-phase cache has occurred based on the first lookup operations locating a real plan corresponding to the generalized query plan, the method 1600 continues to operation 1614. Alternatively, in response to a cache miss of the real plan, the method 1600 continues to the operation 1608.

At operation 1608, compiler 412 performs, in response to a particular cache miss of the multi-phase cache based on the real plan, parsing of the third statement from the third query.

At operation 1610, compiler 412 performs the partial auto-parameterization process based on the parsed third statement.

At operation 1612, compiler 412 performs the second lookup operation on the multi-phase cache based on the partial auto-parameterization process.

At operation 1614, compiler 412 performs, in response to a cache hit of the multi-phase cache based on the second lookup operation locating the real plan, the full auto-parameterization process based on the parsed third statement. In an embodiment, the full auto-parameterization process generates a bind map to use a cached query plan corresponding to the real plan.

At operation 1616, query coordinator 250 sends the real plan to the execution node for execution.

Figure 17:
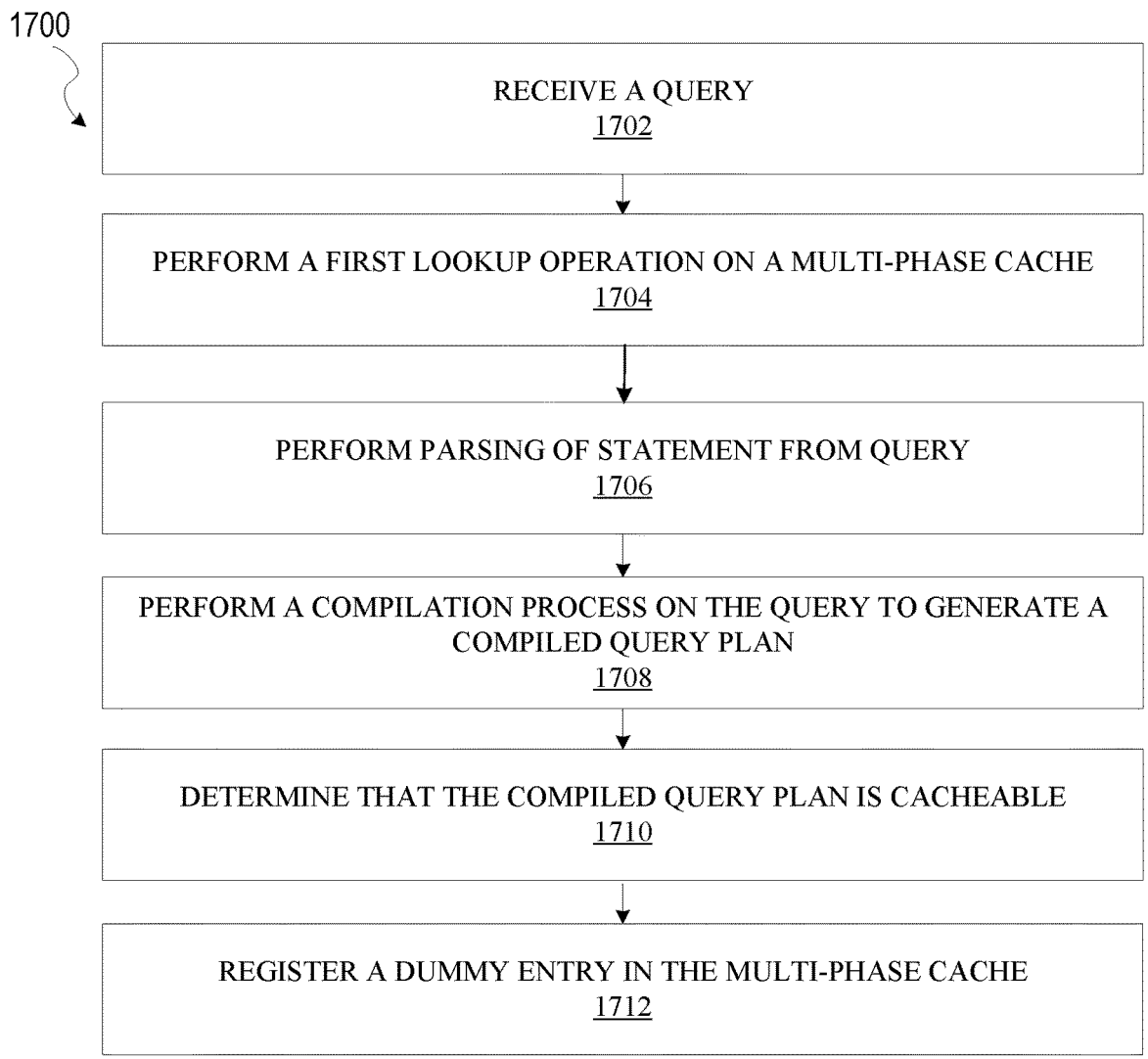
FIG. 17 is a flow diagram illustrating operations of a database system in performing a method, in accordance with some embodiments of the present disclosure.

FIG. 17 is a flow diagram illustrating operations of a database system in performing a method, in accordance with some embodiments of the present disclosure. The method 1700 may be embodied in computer-readable instructions for execution by one or more hardware components (e.g., one or more processors) such that the operations of the method 1700 may be performed by components of network-based database system 102. Accordingly, the method 1700 is described below, by way of example with reference thereto. However, it shall be appreciated that method 1700 may be deployed on various other hardware configurations and is not intended to be limited to deployment within the network-based database system 102.

The operations described below relate to a discussion of a first phase of an example compiler code path.

At operation 1702, query coordinator 250 receives a query, the query including a statement for performing the query.

At operation 1704, compiler 412 performs a first lookup operation on a multi-phase cache based on the query.

At operation 1706, compiler 412 performs, in response to a first cache miss of the multi-phase cache, parsing of the statement from the query.

At operation 1708, compiler 412 performs, based on the parsing, a compilation process on the query to generate a compiled query plan, the compilation process determining an optimization and a generalization for the query.

In an embodiment, the optimization comprises a bind value related program modification, or a query-specific program modification. In an embodiment, the generalization comprises a physical type generalization, auto-parameterization, disabling a set of data dependent optimizations, or disabling pruned expression properties.

At operation 1710, query coordinator 250 determines that the compiled query plan is cacheable.

At operation 1712, query coordinator 250 registers, in response to the compiled query plan being cacheable, a dummy entry in the multi-phase cache (e.g., first phase cache 1310).

In an embodiment, query coordinator 250 sends the compiled query plan to an execution node for execution.

Figure 18:
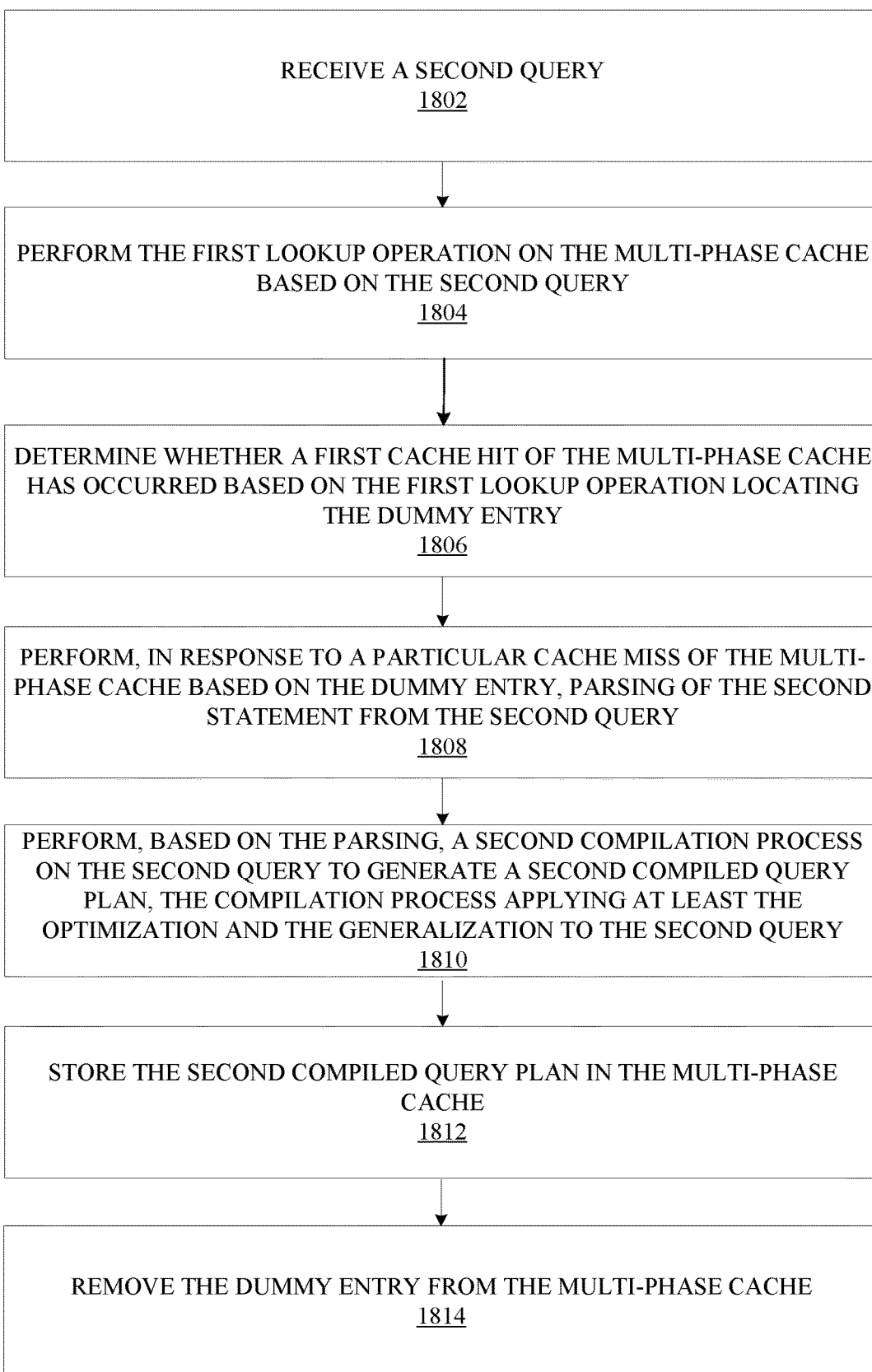
FIG. 18 is a flow diagram illustrating operations of a database system in performing a method, in accordance with some embodiments of the present disclosure.

FIG. 18 is a flow diagram illustrating operations of a database system in performing a method, in accordance with some embodiments of the present disclosure. The method 1800 may be embodied in computer-readable instructions for execution by one or more hardware components (e.g., one or more processors) such that the operations of the method 1800 may be performed by components of network-based database system 102. Accordingly, the method 1800 is described below, by way of example with reference thereto. However, it shall be appreciated that method 1800 may be deployed on various other hardware configurations and is not intended to be limited to deployment within the network-based database system 102.

The operations described below relate to a discussion of a second phase of an example compiler code path, which is performed after the first phase described above in FIG. 17.

At operation 1802, query coordinator 250 receives a second query, the second query including a second statement for performing the second query.

At operation 1804, compiler 412 performs the first lookup operation on the multi-phase cache based on the second query.

At operation 1806, compiler 412 determines whether a first cache hit of the multi-phase cache has occurred based on the first lookup operation locating the dummy entry.

At operation 1808, compiler 412 performs, in response to a particular cache miss of the multi-phase cache based on the dummy entry, parsing of the second statement from the second query.

At operation 1810, compiler 412 performs, based on the parsing, a second compilation process on the second query to generate a second compiled query plan, the compilation process applying at least the optimization and the generalization to the second query.

At operation 1812, query coordinator 250 stores the second compiled query plan in the multi-phase cache.

At operation 1814, query coordinator 250 removes the dummy entry from the multi-phase cache.

In an embodiment, query coordinator 250 sends the compiled query plan to an execution node for execution.

Figure 19:
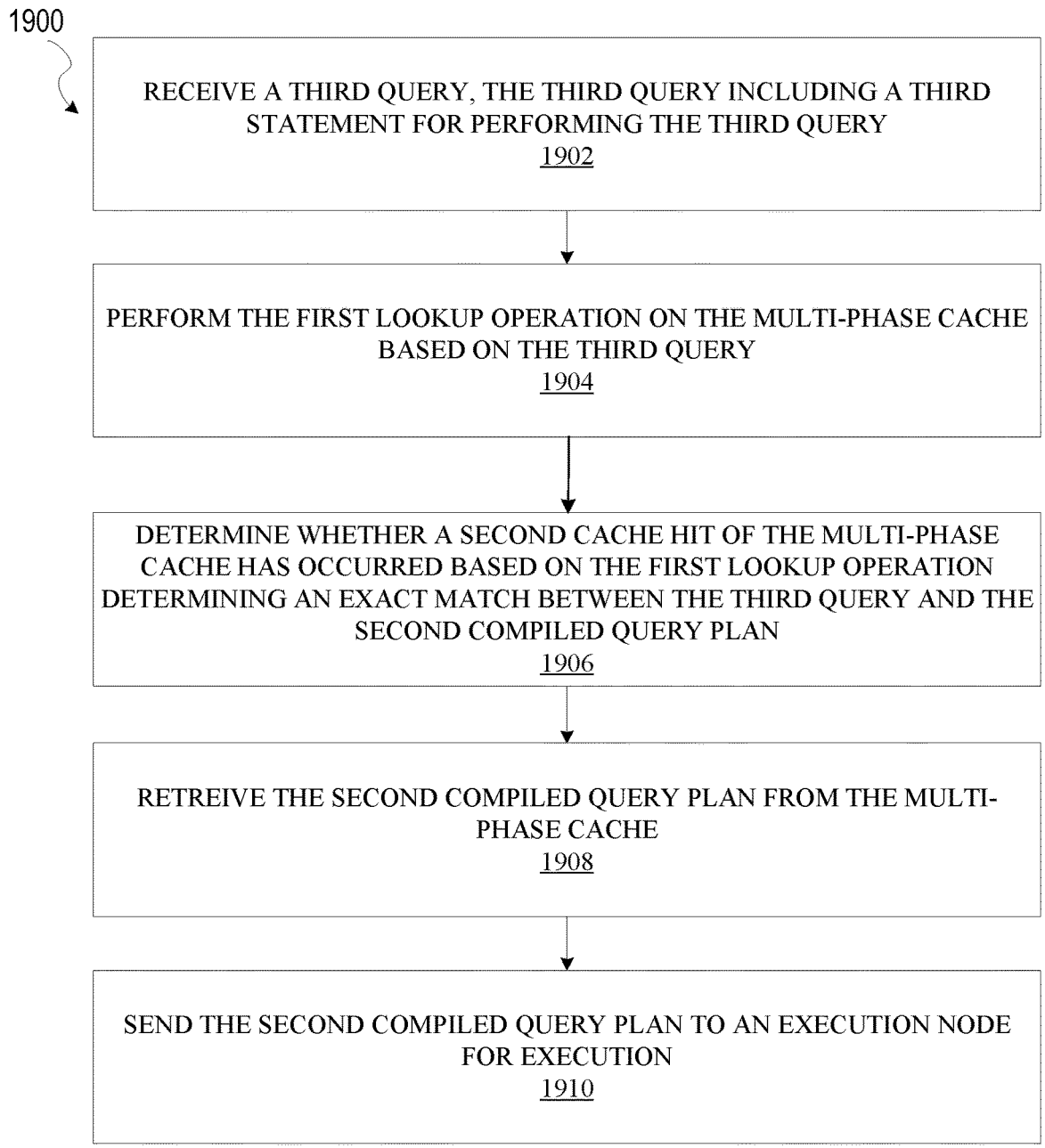
FIG. 19 is a flow diagram illustrating operations of a database system in performing a method, in accordance with some embodiments of the present disclosure.

FIG. 19 is a flow diagram illustrating operations of a database system in performing a method, in accordance with some embodiments of the present disclosure. The method 1900 may be embodied in computer-readable instructions for execution by one or more hardware components (e.g., one or more processors) such that the operations of the method 1900 may be performed by components of network-based database system 102. Accordingly, the method 1900 is described below, by way of example with reference thereto. However, it shall be appreciated that method 1900 may be deployed on various other hardware configurations and is not intended to be limited to deployment within the network-based database system 102.

The operations described below relate to a discussion of a third phase of an example compiler code path, which is performed after the first and second phases described above in FIG. 17 and FIG. 18.

At operation 1902, query coordinator 250 receives a third query, the third query including a third statement for performing the third query.

At operation 1904, compiler 412 performs the first lookup operation on the multi-phase cache based on the third query.

At operation 1906, compiler 412 determines whether a second cache hit of the multi-phase cache has occurred based on the first lookup operation determining an exact match between the third query and the second compiled query plan.

At operation 1908, query coordinator 250 retrieves the second compiled query plan from the multi-phase cache.

At operation 1910, query coordinator 250 sends the second compiled query plan to an execution node for execution.

Figure 20:
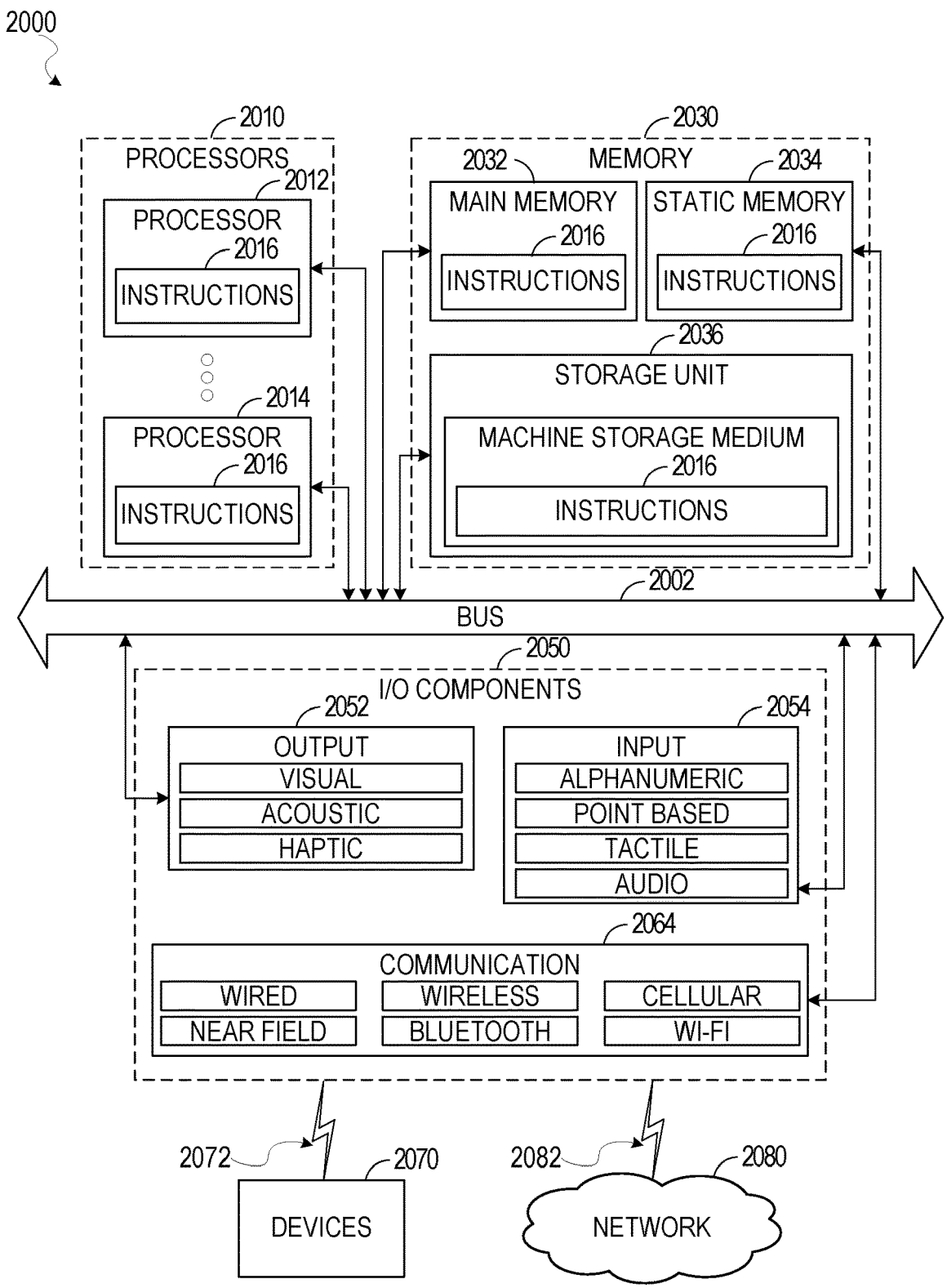
FIG. 20 illustrates a diagrammatic representation of a machine in the form of a computer system within which a set of instructions may be executed for causing the machine to perform any one or more of the methodologies discussed herein, in accordance with some embodiments of the present disclosure.

FIG. 20 illustrates a diagrammatic representation of a machine 2000 in the form of a computer system within which a set of instructions may be executed for causing the machine 2000 to perform any one or more of the methodologies discussed herein, according to an example embodiment. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein may be executed. For example, the instructions 2016 may cause the machine 2000 to execute any one or more operations of any one or more of the methods described above. As another example, the instructions 2016 may cause the machine 2000 to implement portions of the functionality illustrated in any one or more of the previously mentioned figures discussed above. In this way, the instructions 2016 transform a general, non-programmed machine into a particular machine 2000 (e.g., the compute service manager 108-1, the execution platform 110-1, and the user device 112) that is specially configured to carry out any one of the described and illustrated functions in the manner described herein.

In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

The machine 2000 includes processors 2010, memory 2030, and input/output (I/O) components 2050 configured to communicate with each other such as via a bus 2002. In an example embodiment, the processors 2010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2012 and a processor 2014 that may execute the instructions 2016. The term "processor" is intended to include multi-core processors 2010 that may comprise two or more independent processors (sometimes referred to as "cores") that may execute instructions 2016 contemporaneously. Although FIG. 20 shows multiple processors 2010, the machine 2000 may include a single processor with a single core, a single processor with multiple cores (e.g., a multi-core processor), multiple processors with a single core, multiple processors with multiple cores, or any combination thereof.

The memory 2030 may include a main memory 2032, a static memory 2034, and a storage unit 2036, all accessible to the processors 2010 such as via the bus 2002. The main memory 2032, the static memory 2034, and the storage unit 2036 store the instructions 2016 embodying any one or more of the methodologies or functions described herein. The instructions 2016 may also reside, completely or partially, within the main memory 2032, within the static memory 2034, within the storage unit 2036, within at least one of the processors 2010 (e.g., within the processor's cache memory), or any suitable combination thereof, during execution thereof by the machine 2000.

The I/O components 2050 include components to receive input, provide output, produce output, transmit information, exchange information, capture measurements, and so on. The specific I/O components 2050 that are included in a particular machine 2000 will depend on the type of machine. For example, portable machines such as mobile phones will likely include a touch input device or other such input mechanisms, while a headless server machine will likely not include such a touch input device. It will be appreciated that the I/O components 2050 may include many other components that are not shown in FIG. 20. The I/O components 2050 are grouped according to functionality merely for simplifying the following discussion and the grouping is in no way limiting. In various example embodiments, the I/O components 2050 may include output components 2052 and input components 2054. The output components 2052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 2054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 2050 may include communication components 2064 operable to couple the machine 2000 to a network 2080 or devices 2070 via a coupling 2082 and a coupling 2072, respectively. For example, the communication components 2064 may include a network interface component or another suitable device to interface with the network 2080. In further examples, the communication components 2064 may include wired communication components, wireless communication components, cellular communication components, and other communication components to provide communication via other modalities. The devices 2070 may be another machine or any of a wide variety of peripheral devices (e.g., a peripheral device coupled via a universal serial bus (USB)). For example, as noted above, the machine 2000 may correspond to any one of the compute service manager 108-1, the execution platform 110, and the devices 2070 may include the user device 112 or any other computing device described herein as being in communication with the network-based database system 102 or the storage platform 104.

Executable Instructions and Machine Storage Medium

The various memories (e.g., 2030, 2032, 2034, and/or memory of the processor(s) 2010 and/or the storage unit 2036) may store one or more sets of instructions 2016 and data structures (e.g., software) embodying or utilized by any one or more of the methodologies or functions described herein. These instructions 2016, when executed by the processor(s) 2010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 2080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2080 or a portion of the network 2080 may include a wireless or cellular network, and the coupling 2082 may be a Code Division Multiple Access (CDMA) connection, a Global System for Mobile communications (GSM) connection, or another type of cellular or wireless coupling. In this example, the coupling 2082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2016 may be transmitted or received over the network 2080 using a transmission medium via a network interface device (e.g., a network interface component included in the communication components 2064) and utilizing any one of a number of well-known transfer protocols (e.g., hypertext transfer protocol (HTTP)). Similarly, the instructions 2016 may be transmitted or received using a transmission medium via the coupling 2072 (e.g., a peer-to-peer coupling) to the devices 2070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2016 for execution by the machine 2000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The invention claimed is:

1. A network-based database system comprising:
   at least one hardware processor; and
   a memory storing instructions that cause the at least one hardware processor to perform operations comprising:
   receiving a query, the query including a statement for performing the query;
   performing a first lookup operation on a multi-phase cache based on the query;
   performing, in response to a first cache miss of the multi-phase cache, parsing of the statement from the query;
   performing, based on the parsing, a compilation process on the query to generate a compiled query plan, the compilation process determining an optimization and a generalization for the query;
   determining that the compiled query plan is cacheable;
   registering, in response to the compiled query plan being cacheable, a dummy entry in the multi-phase cache;
   receiving a second particular query, the second particular query including a second particular statement for performing the second particular query;
   performing, in response to a cache miss of the multi-phase cache based on the dummy entry, parsing of the second particular statement from the second particular query;
   performing a partial auto-parameterization process based on the parsed second particular statement;
   performing a second particular lookup operation on the multi-phase cache based on the partial auto-parameterization process;
   determining a set of generalization requirements, the determining based on performing a full auto-parameterization process that generates a modified parse tree with the set of generalization requirements being applied; and
   performing the compilation process on the second particular query to generate a compiled second particular query plan, the compilation process using the set of generalization requirements.

2. The system of claim 1, wherein the operations further comprise:
   receiving a second query, the second query including a second statement for performing the second query;
   performing the first lookup operation on the multi-phase cache based on the second query;
   determining whether a first cache hit of the multi-phase cache has occurred based on the first lookup operation locating the dummy entry;
   performing, in response to a particular cache miss of the multi-phase cache based on the dummy entry, parsing of the second statement from the second query;
   performing, based on the parsing, a second compilation process on the second query to generate a second compiled query plan, the compilation process applying at least the optimization and the generalization to the second query;
   storing the second compiled query plan in the multi-phase cache; and
   removing the dummy entry from the multi-phase cache.

3. The system of claim 2, wherein the operations further comprise:
   receiving a third query, the third query including a third statement for performing the third query;
   performing the first lookup operation on the multi-phase cache based on the third query;
   determining whether a second cache hit of the multi-phase cache has occurred based on the first lookup operation determining an exact match between the third query and the second compiled query plan;
   retrieving the second compiled query plan from the multi-phase cache; and sending the second compiled query plan to an execution node for execution.

4. The system of claim 2, wherein the operations further comprise:
sending the second compiled query plan to an execution node for execution.

5. The system of claim 1, wherein the optimization comprises a bind value related program modification, or a query-specific program modification.

6. The system of claim 1, wherein the generalization comprises a physical type generalization, auto-parameterization, disabling a set of data dependent optimizations, or disabling pruned expression properties.

7. The system of claim 1, wherein the operations further comprise:
sending the compiled query plan to an execution node for execution.

8. The system of claim 1, wherein the operations further comprise:
prior to receiving the second particular query, receiving a particular query, the particular query including a particular statement for performing the particular query;
performing a first particular lookup operation on a multi-phase cache based on the particular query;
performing, in response to a first particular cache miss of the multi-phase cache, parsing of the particular statement from the particular query;
performing the partial auto-parameterization process based on the parsed particular statement, the partial auto-parameterization process generating a parameterized query hash and initializing a set of generalizations;
performing the second particular lookup operation on the multi-phase cache based on the partial auto-parameterization process;
performing, in response to a second particular cache miss of the multi-phase cache, a compilation process on the particular query to generate a compiled particular query plan;
sending the compiled particular query plan to an execution node for execution;
determining that the compiled particular query plan is cacheable; and
registering, in response to the compiled particular query plan being cacheable, a dummy entry in the multi-phase cache.

9. The system of claim 8, wherein the operations further comprise:
performing the first particular lookup operation on the multi-phase cache based on the second particular query; and
determining whether a first particular cache hit of the multi-phase cache has occurred based on the first particular lookup operation locating the dummy entry.

10. The system of claim 9, wherein the operations further comprise:
sending the compiled second particular query plan to the execution node for execution;
determining that the compiled second particular query plan is cacheable;
registering, in response to the compiled query plan being cacheable, a generalized query plan in the multi-phase cache; and
removing the dummy entry from the multi-phase cache.

11. A method comprising:
receiving a query, the query including a statement for performing the query;
performing a first lookup operation on a multi-phase cache based on the query;
performing, in response to a first cache miss of the multi-phase cache, parsing of the statement from the query;
performing a partial auto-parameterization process based on the parsed statement, the partial auto-parameterization process generating a parameterized query hash and initializing a set of generalizations;
performing a second lookup operation on the multi-phase cache based on the partial auto-parameterization process;
performing, in response to a second cache miss of the multi-phase cache, a compilation process on the query to generate a compiled query plan;
sending the compiled query plan to an execution node for execution;
determining that the compiled query plan is cacheable;
registering, in response to the compiled query plan being cacheable, a dummy entry in the multi-phase cache;
receiving a second particular query, the second particular query including a second particular statement for performing the second particular query;
performing, in response to a cache miss of the multi-phase cache based on the dummy entry, parsing of the second particular statement from the second particular query;
performing a partial auto-parameterization process based on the parsed second particular statement;
performing a second particular lookup operation on the multi-phase cache based on the partial auto-parameterization process;
determining a set of generalization requirements, the determining based on performing a full auto-parameterization process that generates a modified parse tree with the set of generalization requirements being applied; and
performing the compilation process on the second particular query to generate a compiled second particular query plan, the compilation process using the set of generalization requirements.

12. The method of claim 11, further comprising:
performing the first lookup operation on the multi-phase cache based on the second query; and
determining whether a first cache hit of the multi-phase cache has occurred based on the first lookup operation locating the dummy entry.

13. The method of claim 11, further comprising:
performing the compilation process on the second query to generate a compiled second query plan, the compilation process using the set of generalization requirements;
sending the compiled second query plan to the execution node for execution;
determining that the compiled second query plan is cacheable;
registering, in response to the compiled query plan being cacheable, a generalized query plan in the multi-phase cache; and
removing the dummy entry from the multi-phase cache.

14. The method of claim 13, further comprising:
receiving a third query, the third query including a third statement for performing the third query;
performing the first lookup operation on the multi-phase cache based on the third query; and determining whether a first cache hit of the multi-phase cache has occurred based on the first lookup operation locating a real plan corresponding to the generalized query plan.

15. The method of claim 14, further comprising:
performing, in response to a particular cache miss of the multi-phase cache based on the real plan, parsing of the third statement from the third query;
performing the partial auto-parameterization process based on the parsed third statement; and
performing the second lookup operation on the multi-phase cache based on the partial auto-parameterization process.

16. The method of claim 15, further comprising:
performing, in response to a cache hit of the multi-phase cache based on the second lookup operation locating the real plan, a full auto-parameterization process based on the parsed third statement.

17. The method of claim 16, wherein the full auto-parameterization process generates a bind map to use a cached query plan corresponding to the real plan.

18. The method of claim 16, further comprising:
sending the real plan to the execution node for execution.

19. The method of claim 11, wherein determining the set of generalization requirements is based on performing a full auto-parameterization process that generates a modified parse tree with the set of generalization requirements being applied.

20. A non-transitory computer-storage medium comprising instructions that, when executed by one or more processors of a machine, configure the machine to perform operations comprising:
receiving a query, the query including a statement for performing the query;
performing a first lookup operation on a multi-phase cache based on the query;
performing, in response to a first cache miss of the multi-phase cache, parsing of the statement from the query;
performing a partial auto-parameterization process based on the parsed statement, the partial auto-parameterization process generating a parameterized query hash and initializing a set of generalizations;
performing a second lookup operation on the multi-phase cache based on the partial auto-parameterization process;
performing, in response to a second cache miss of the multi-phase cache, a compilation process on the query to generate a compiled query plan;
sending the compiled query plan to an execution node for execution;
determining that the compiled query plan is cacheable;
registering, in response to the compiled query plan being cacheable, a dummy entry in the multi-phase cache;
receiving a second particular query, the second particular query including a second particular statement for performing the second particular query;
performing, in response to a cache miss of the multi-phase cache based on the dummy entry, parsing of the second particular statement from the second particular query;
performing a partial auto-parameterization process based on the parsed second particular statement;
performing a second particular lookup operation on the multi-phase cache based on the partial auto-parameterization process;
determining a set of generalization requirements, the determining based on performing a full auto-parameterization process that generates a modified parse tree with the set of generalization requirements being applied; and
performing the compilation process on the second particular query to generate a compiled second particular query plan, the compilation process using the set of generalization requirements.

21. The non-transitory computer-storage medium of claim 20, wherein the operations further comprise:
performing the first lookup operation on the multi-phase cache based on the second query; and
determining whether a first cache hit of the multi-phase cache has occurred based on the first lookup operation locating the dummy entry.

22. The non-transitory computer-storage medium of claim 20, wherein the operations further comprise:
performing the compilation process on the second query to generate a compiled second query plan, the compilation process using the set of generalization requirements;
sending the compiled second query plan to the execution node for execution;
determining that the compiled second query plan is cacheable;
registering, in response to the compiled query plan being cacheable, a generalized query plan in the multi-phase cache; and
removing the dummy entry from the multi-phase cache.

23. The non-transitory computer-storage medium of claim 22, wherein the operations further comprise:
receiving a third query, the third query including a third statement for performing the third query;
performing the first lookup operation on the multi-phase cache based on the third query; and
determining whether a first cache hit of the multi-phase cache has occurred based on the first lookup operation locating a real plan corresponding to the generalized query plan.

24. The non-transitory computer-storage medium of claim 23, wherein the operations further comprise:
performing, in response to a particular cache miss of the multi-phase cache based on the real plan, parsing of the third statement from the third query;
performing the partial auto-parameterization process based on the parsed third statement; and
performing the second lookup operation on the multi-phase cache based on the partial auto-parameterization process.

25. The non-transitory computer-storage medium of claim 24, wherein the operations further comprise:
performing, in response to a cache hit of the multi-phase cache based on the second lookup operation locating the real plan, a full auto-parameterization process based on the parsed third statement.

26. The non-transitory computer-storage medium of claim 25, wherein the full auto-parameterization process generates a bind map to use a cached query plan corresponding to the real plan.

27. The non-transitory computer-storage medium of claim 25, wherein the operations further comprise:
sending the real plan to the execution node for execution.

28. The non-transitory computer-storage medium of claim 20, wherein determining the set of generalization requirements is based on performing a full auto-parameterization process that generates a modified parse tree with the set of generalization requirements being applied.

* * * * *